United States Patent
van Leeuwen et al.

(10) Patent No.: US 6,644,459 B2
(45) Date of Patent: Nov. 11, 2003

(54) BELT TRANSFER ASSEMBLY

(75) Inventors: Thomas A. van Leeuwen, Mississauga (CA); Mohammad Ghaeli, Oakville (CA)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 0 days.

(21) Appl. No.: 10/025,639

(22) Filed: Dec. 19, 2001

(65) Prior Publication Data

US 2003/0111320 A1 Jun. 19, 2003

(51) Int. Cl.[7] .............................................. B65G 47/10
(52) U.S. Cl. ................................ 198/370.1; 198/370.06
(58) Field of Search ........................ 198/370.01, 370.06, 198/370.1, 371.2

(56) References Cited

U.S. PATENT DOCUMENTS

| | | | | |
|---|---|---|---|---|
| 3,086,640 A | | 4/1963 | Verrinder | 198/33 |
| 3,104,004 A | * | 9/1963 | Poel et al. | 198/370.1 X |
| 3,621,973 A | | 11/1971 | Carlson et al. | 198/29 |
| 4,174,774 A | | 11/1979 | Bourgeois | |
| 4,798,275 A | | 1/1989 | Leemkuil et al. | 198/372 |
| 4,880,099 A | | 11/1989 | Leemkuil et al. | 198/371 |
| 4,926,999 A | | 5/1990 | Fauth, Sr. et al. | 198/358 |
| 4,962,841 A | | 10/1990 | Kloosterhouse | 198/372 |
| 5,165,516 A | * | 11/1992 | Reed et al. | 198/370.1 |
| 5,205,394 A | * | 4/1993 | Zeuschner | 198/370.1 |
| 5,219,063 A | | 6/1993 | Wyatt | 198/840 |
| 5,743,375 A | | 4/1998 | Shyr et al. | 198/463.3 |
| 6,216,847 B1 | | 4/2001 | Schmidt | 198/463.3 |
| 6,343,685 B1 | | 2/2002 | Hofer | 198/370.09 |

* cited by examiner

Primary Examiner—James R. Bidwell
(74) Attorney, Agent, or Firm—Van Dyke, Gardner, Linn & Burkhart, LLP

(57) ABSTRACT

A transfer assembly for positioning between conveyor sections and for transferring at least one article laterally with respect to the conveying surface defined by the conveyor sections in a direction angled to the conveying direction of the conveying surface includes at least two conveying devices, which define a conveying surface for at least generally aligning with the conveying surface of the conveyor sections, and a sheave assembly. The sheave assembly includes a support member and a reinforced transfer belt having a belt length and defining a transfer surface. At least two transfer sheaves are mounted to the support member with the transfer sheaves supporting the transfer belt. The support member is adapted to move the transfer belt between a non-transferring position wherein the transfer surface is below the conveying surface of the conveying devices and a transferring position wherein the transfer surface is raised above the conveying surface of the conveying devices. The transfer assembly is adapted to move the transfer belt such that the length of the transfer belt changes less than one-quarter of an inch when moved between its non-transferring position and its transferring position.

43 Claims, 21 Drawing Sheets

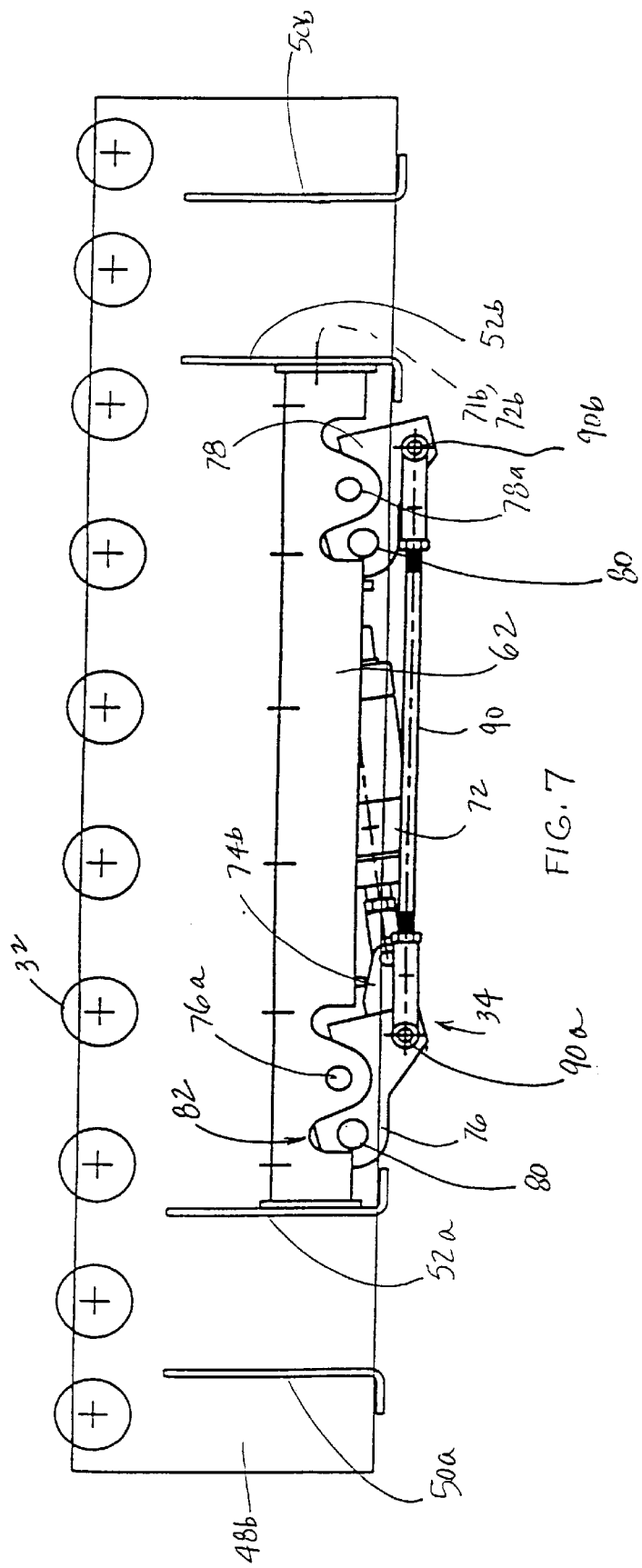

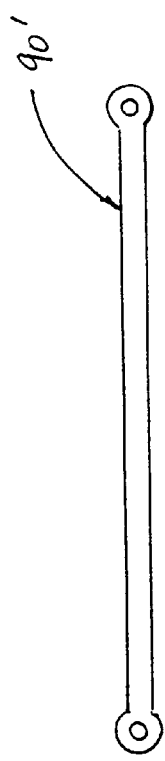
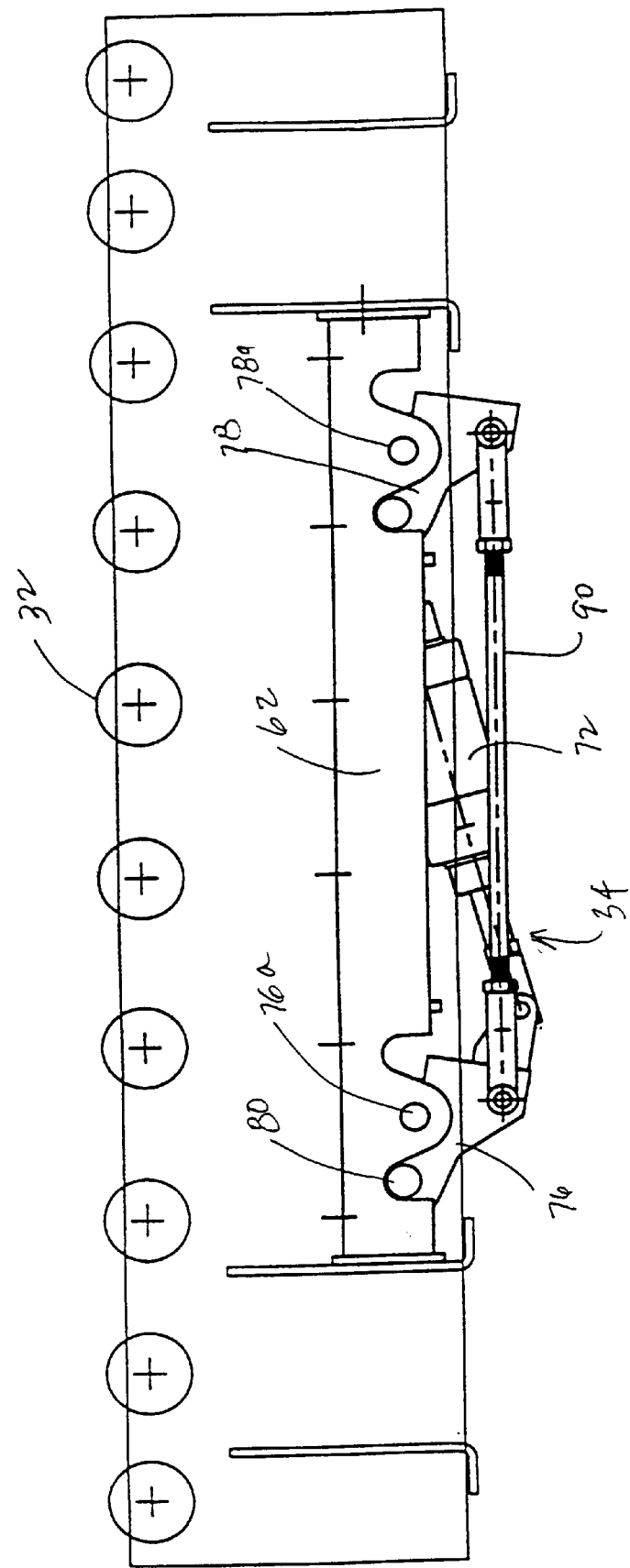
FIG. 8A
FIG. 8

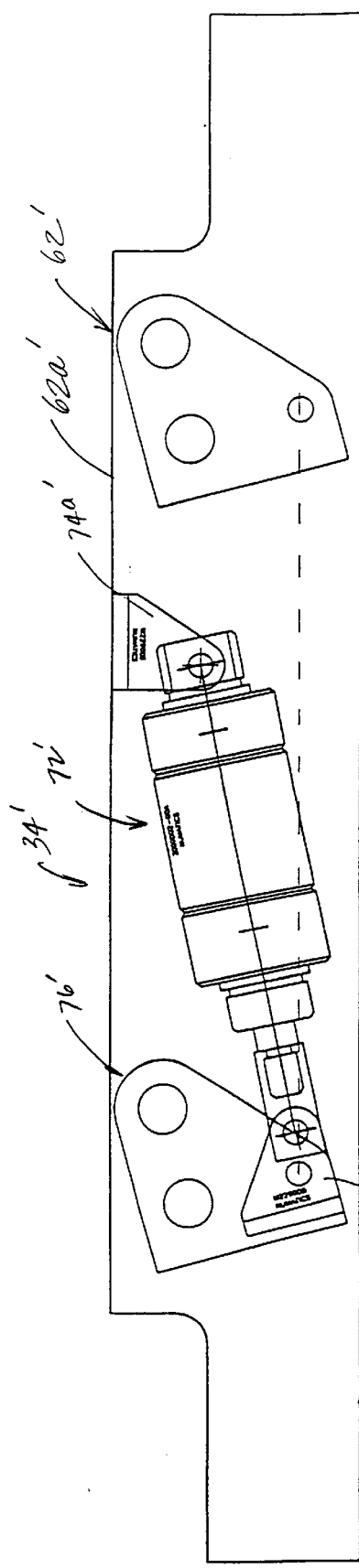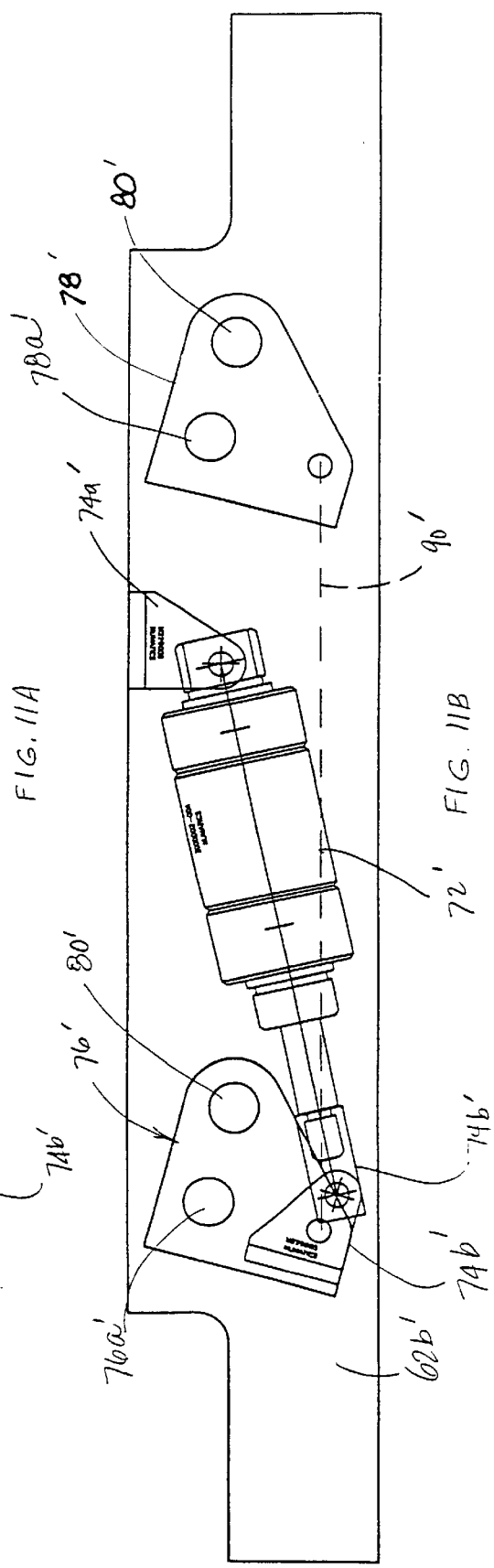
FIG. 11A
FIG. 11B

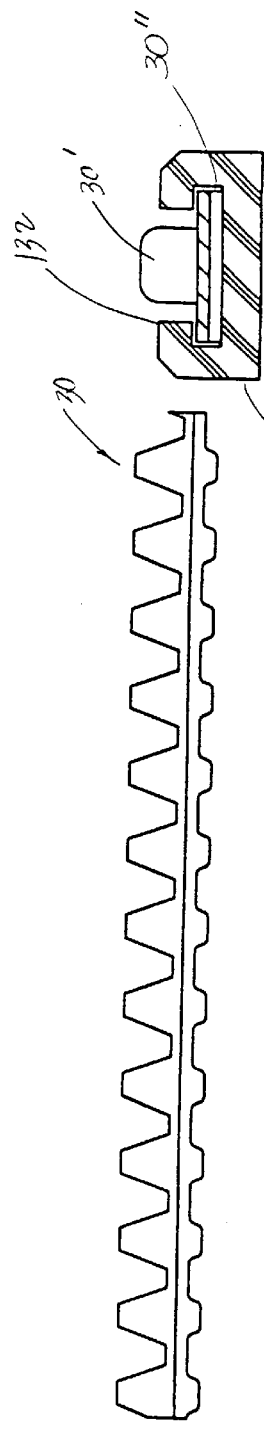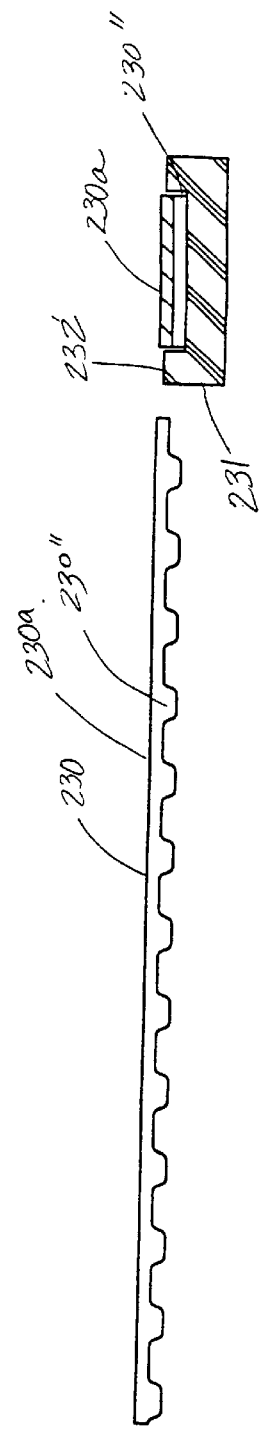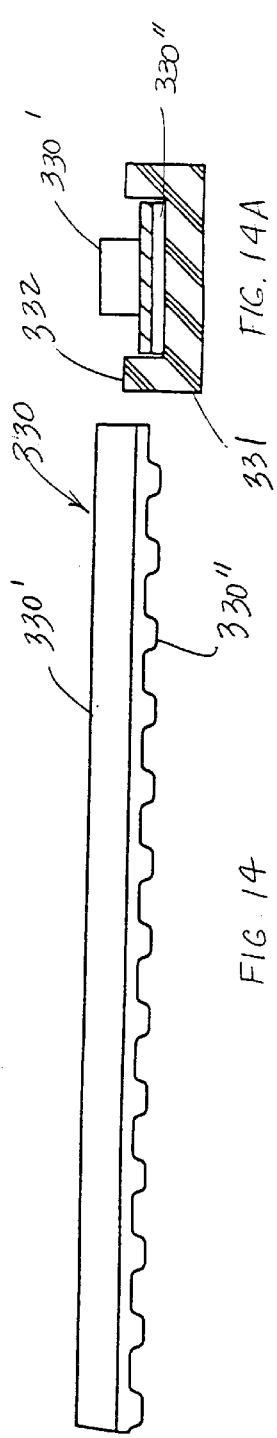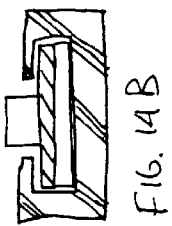

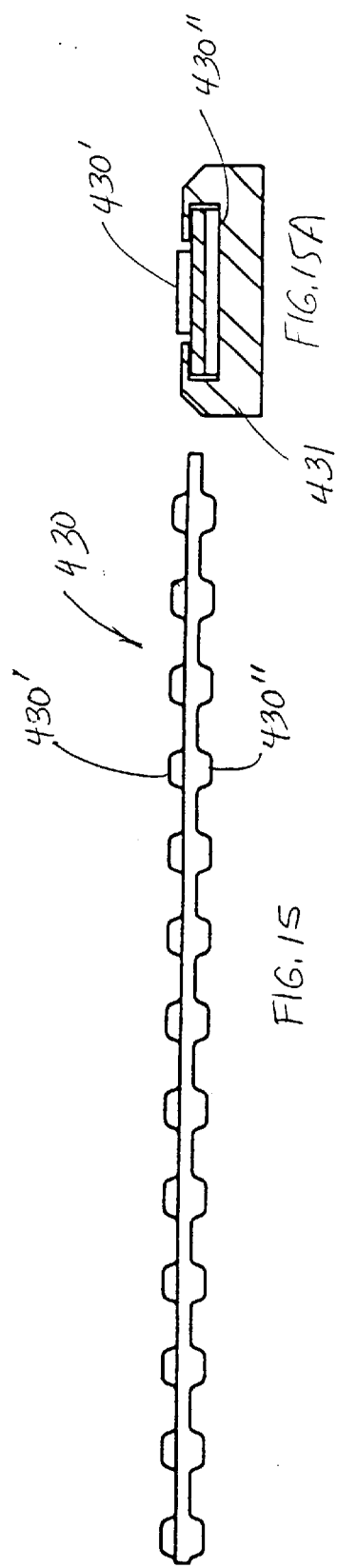
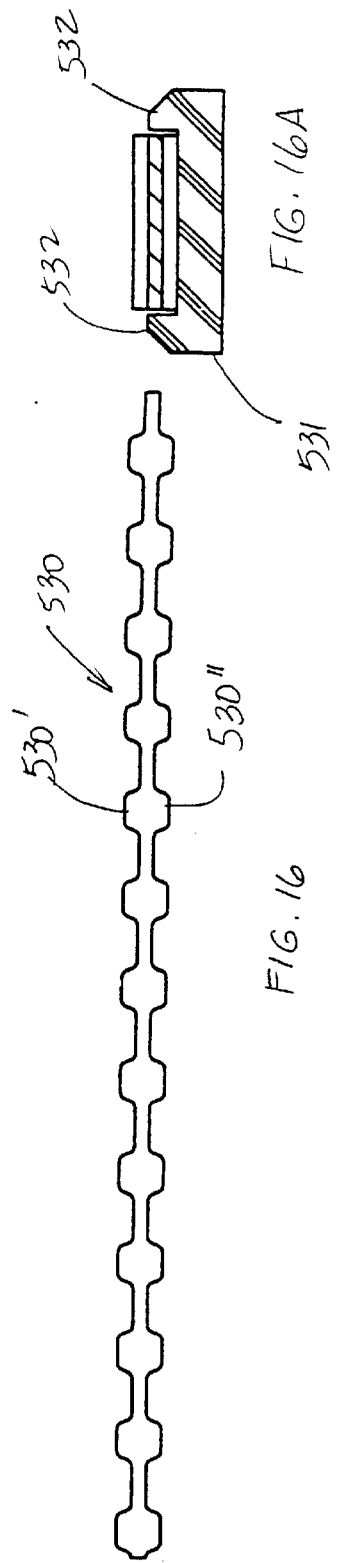
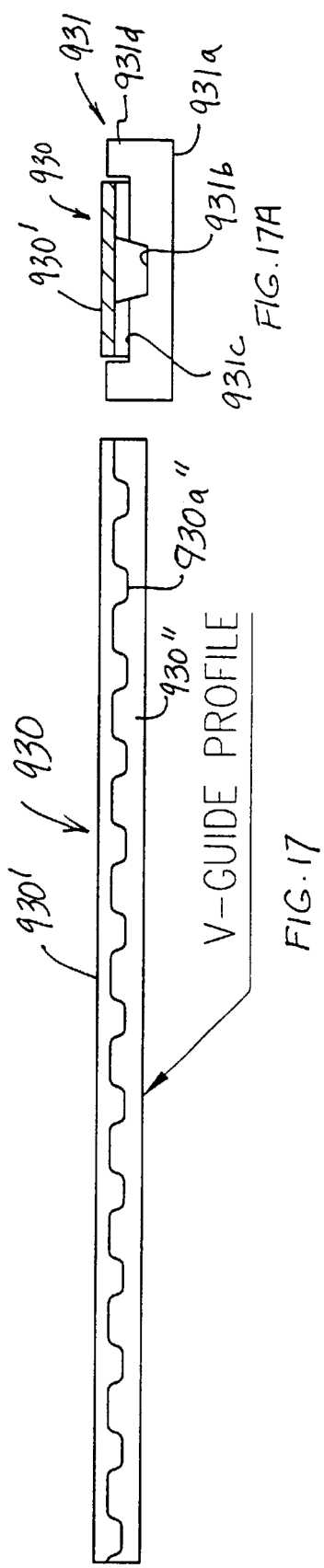

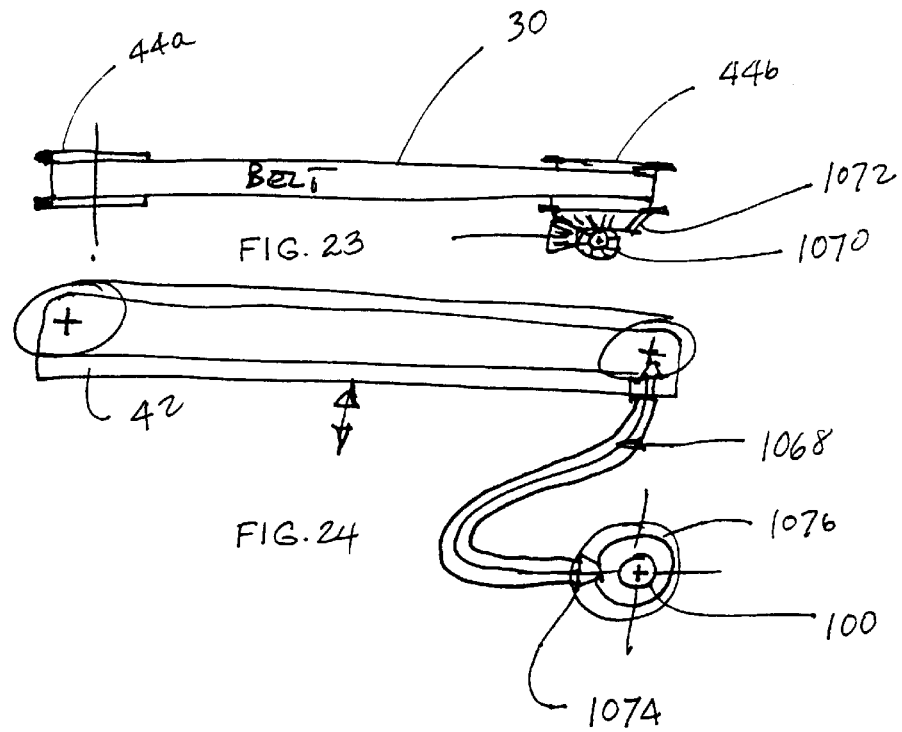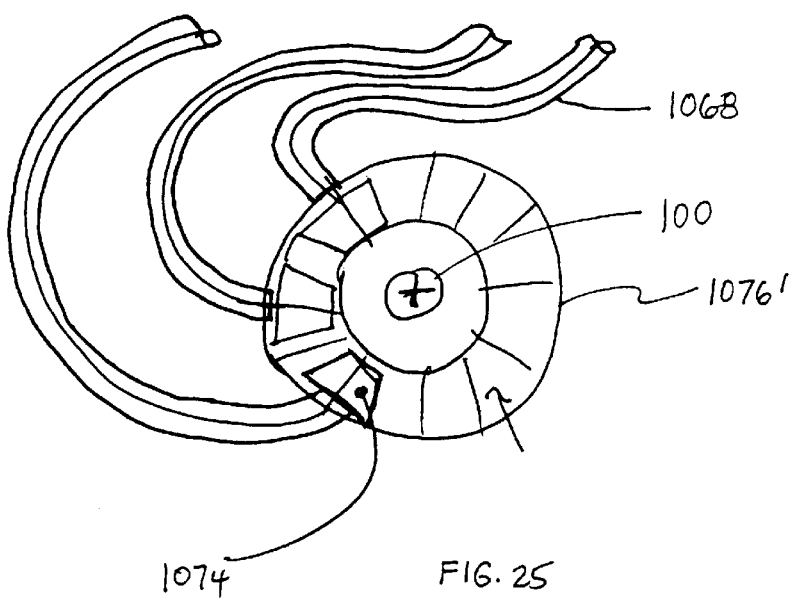

BELT TRANSFER ASSEMBLY

TECHNICAL FIELD AND BACKGROUND OF THE INVENTION

The present invention generally relates to a belt transfer assembly and, more particularly, to a belt transfer assembly that transfers articles generally at a 90° angle to the main conveyor, and which is particularly suitable for placement in line in a conveying system between conveying sections.

Transfer assemblies are typically positioned between two in-line conveyor sections, including roller or belt driven conveyor sections, and adjacent one or more transfer conveyor sections for selectively transferring articles from one of the in-line conveyor sections to the transfer conveyor sections. Transfer assemblies typically move the articles to be transferred at right angles with respect to the conveying direction of the conveyor sections.

Conventional transfer assemblies include a plurality of rollers and a plurality of grooved sheaves, which are positioned between the respective rollers. The sheaves are oriented in a direction orthogonal to the conveying direction of the rollers and are often driven by the main line drive shaft of the adjacent conveyor sections. Extending around the groove sheaves are transfer belts, which are positioned by the groove sheaves between the rollers just below the conveying surface of the rollers. When a transfer is to take place, a group of the grooved sheaves is raised such that the transfer belts positioned in the grooved sheaves are raised between the rollers to lift the articles on the rollers off the rollers and to transfer them at right angles with respect to the rollers so that the articles can be deposited on one of the adjacent transfer conveyors. It should be understood that the term "90°" or "right angle" includes clockwise and counter-clockwise 90° directions.

In most applications, the transfer belts are raised under the article while the article is still moving. Since the article is moving at right angles to the transfer belt, the article induces lateral forces in the transfer belts. Typically, the transfer belts stop the forward motion of the article while transferring it laterally to the transfer conveyor. Depending on the size of the article being transferred and/or the shape of the article being transferred, there may be a tendency when the transfer belts engage the article for the lateral forces to induce the transfer belts to roll out of their respective grooved sheaves which results in increased wear of the transfer belts.

In addition, a conventional transfer belt typically comprises an extensible belt material, which exhibits elastic properties so that the belt can accommodate the change in length required to move between its non-transferring position and its transferring position. For example, typical belts may stretch on the order of one and a half inches in length. One problem with the more flexible belts, is that they may be pulled off the grooved sheaves when transferring an article. For example, a heavy article may cause the belt to deform locally and cause the belt to roll out of the sheaves and often break.

Consequently, there is a need for a transfer assembly which will limit the transfer belts from rolling out of their respective transfer sheaves to thereby enhance the longevity of the transfer belts and enhance the efficiency of the conveying system which incorporates the transfer assembly.

SUMMARY OF THE INVENTION

Accordingly, the present invention provides a transfer assembly for positioning between main conveyor sections and one or more transfer conveyor sections. The transfer assembly exhibits greater retention of the transfer belt in the transfer sheaves resulting in an increased life expectancy for the transfer belt while maintaining sufficient engagement with the articles being transferred to efficiently transfer the articles.

According to one form of the invention, a transfer assembly for positioning between conveyor sections includes at least two conveying devices, which define a conveying surface for at least generally aligning with the conveying surface of the conveyor sections, and a sheave assembly. The sheave assembly includes a support member, a reinforced transfer belt, and at least two transfer sheaves mounted to the support, which support the transfer belt. The support member is adapted to move the transfer belt between a non-transferring position wherein the transfer surface of the transfer belt is below the conveying surface of the conveying devices and a transferring position where the transfer surface of the transfer belt is raised above the conveying surface of the conveying devices. The transfer assembly is adapted to move the transfer belt such that the belt length of the transfer belt changes less than one quarter of an inch when moved between its non-transferring position and its transferring position.

In one aspect, the transfer belt comprises a Kevlar® reinforced transfer belt. Alternately, the transfer belt may comprise a fiberglass reinforced transfer belt. In another aspect, the transfer belt comprises a polyester reinforced transfer belt or a transfer belt reinforced by a reinforcing core, such as one or more steel cables, one or more steel cords, or other reinforcing fibers.

According to yet another aspect, the transfer belt includes a generally rectangular cross-section, and may include a plurality of projecting teeth. For example, the teeth may project from the transfer surface and/or the driven surface.

In another aspect, the sheave assembly further includes a track, with at least a portion of the transfer belt being guided through the track. The track provides additional retention of the transfer belt on the sheave assembly.

According to yet another aspect, the transfer assembly includes a lift assembly for moving the sheave assembly between the transferring position and the non-transferring position. For example, the lift assembly may include a cylinder, which lifts and lowers the sheave assembly to move the sheave assembly between its transferring and non-transferring positions. In a further aspect, the transfer assembly includes a frame, with the cylinder being pivotally mounted at one end to the frame of the transfer assembly. In a further aspect, the cylinder is pivotally mounted to the frame of the transfer assembly by a crank arm, which includes a lifter pin for selectively lifting the sheave assembly when the cylinder is actuated. In a further aspect, the transfer assembly includes a second crank arm which includes a second lifter pin. The crank arms are coupled whereby the movement of one crank arm induces movement of the other crank arm, with the first and second lifter pins selectively lifting the sheave assembly when the cylinder is actuated.

According to another aspect, the transfer belt includes a generally horizontal upper belt section which defines the transfer surface and a lower belt section. At least a portion of the lower belt section remains substantially parallel with respect to the upper belt section when the transfer belt is in either of its transferring position or its non-transferring position. In a further aspect, the transfer assembly includes a driven shaft and a drive shaft, with the drive shaft selectively driving the driven shaft and the driven shaft driving the transfer sheaves to thereby drive the transfer belt. The transfer belt preferably forms a closed loop around the transfer sheaves and the driven shaft, with the driven shaft remaining stationary when the sheave assembly is moved to its transferring position.

In another form of the invention, a sheave assembly of a transfer assembly includes a support member, a transfer belt, and at least two transfer sheaves which are mounted to the support member. The support member includes a rail. The transfer sheaves support the transfer belt, which extends through the rail, with the rail at least laterally retaining the transfer belt on the sheave assembly when the transfer belt is subject to a lateral force from an article being transferred by the transfer belt.

In one aspect, the transfer belt comprises a reinforced belt, such as a Kevlar® reinforced transfer belt, a fiberglass reinforced transfer belt, a polyester reinforced transfer belt or a steel core reinforced transfer belt, such as a belt reinforced by steel cords or cables.

According to yet another form of the invention, a transfer assembly for a conveyor system includes at least two conveying surfaces defining a conveying direction, at least two driven transfer sheaves positioned between the conveying surfaces, and a transfer belt which extends over the transfer sheaves. The transfer assembly further includes a driven belt shaft which includes a driven sheave, with the transfer belt forming a closed loop around the transfer sheaves and the driven sheave. The transfer belt is driven by the driven sheave to move in a transfer direction non-parallel to the conveying direction. The transfer assembly further includes an actuator which moves the transfer sheaves between a first position wherein the transfer surface of the transfer belt is below the conveying surface and a second position wherein the transfer surface is above the conveying surface for lifting an article being conveyed on the conveying surface and transferring the article in the transfer direction. The transfer belt has a generally horizontal belt portion which defines the transfer surface and generally horizontal lower belt portions between the transfer sheaves and the driven sheave wherein the change in length of the transfer belt is minimized when actuator moves the transfer sheaves between the first and second positions.

In one aspect, the transfer assembly includes a plurality of conveying surfaces, and a plurality of pairs of the transfer sheaves with a corresponding plurality of transfer belts.

In a further aspect, the pairs of transfer sheaves are supported by a common support. In addition, the transfer assembly further includes an actuator which moves the support between the first position and a second position to thereby move the transfer belt. Preferably, the actuator contacts the support at at least two points to maintain the transfer sheaves and the transfer belts generally level.

According to yet another aspect, the transfer assembly includes a main line drive shaft, which selectively drives the driven belt shaft. For example, the main line drive shaft may include a clutch assembly for selectively driving the driven belt shaft. Furthermore, the main line drive shaft may be adapted to selectively drive the driven belt shaft in either a counter-clockwise direction or a counter-clockwise direction wherein the transfer belt moves in a first transferring direction when the driven belt shaft is moved in a clockwise direction and moved in an opposite second transfer direction when the driven belt shaft is moved in a counter-clockwise direction.

The present invention provides an improved transfer assembly which exhibits increased retention of the transfer belt in the transfer assembly, thus extending the life of the transfer belt and improving the efficiency of a conveying system incorporating the transfer assembly.

These and other objects, advantages, purposes, and features of the invention will become more apparent from the study of the following description taken in conjunction with the drawings.

BRIEF DESCRIPTION OF THE DRAWINGS

FIG. 7 is a similar view to FIG. 4 illustrating the lift assembly in a lowered position;

FIG. 8 is a similar view to FIG. 7 illustrating the lift assembly in a lifting position;

FIG. 8A is an elevation view of another embodiment of the rod of the lift assembly;

FIG. 11A is an enlarged elevation of another embodiment of the lift assembly;

FIG. 11B is a similar view to FIG. 11A illustrating the lift assembly in a lowered position;

FIG. 12 is a fragmentary view of a section of a transfer belt of the present invention;

FIG. 12A is a cross-section view of the transfer belt supported in a track of the transfer assembly;

FIG. 13 is a fragmentary view of another embodiment of the transfer belt of the present invention;

FIG. 13A is a cross-section view of the transfer belt of FIG. 13 in a track of the transfer assembly of the present invention;

FIG. 14 is a fragmentary view of another embodiment of the transfer belt of the present invention;

FIG. 14A is a cross-section view of the transfer belt of FIG. 14 supported in a track of the transfer assembly of the present invention;

FIG. 14B is a cross-section view of the transfer belt of FIG. 14 supported in another embodiment of the track;

FIG. 15 is a fragmentary view of another embodiment of the transfer belt of the present invention;

FIG. 15A is a cross-section view of the belt of FIG. 15 illustrated supported in a track of the transfer assembly of the present invention;

FIG. 16 is a fragmentary view of another embodiment of the transfer belt of the present invention;

FIG. 16A is a cross-section view of the belt of FIG. 16 being supported in a track of the transfer assembly of the present invention;

FIG. 17 is a cross-section view of another embodiment of the transfer belt;

FIG. 17A is a cross-section view of the transfer belt of FIG. 17 supported in a track of the transfer assembly;

FIG. 23 is a plan view of an alternate embodiment of a transfer assembly incorporating the use of flexible shafts;

FIG. 24 is an elevation view of the transfer assembly of FIG. 23; and

FIG. 25 is another embodiment of the configuration of the flexible shafts illustrated in FIGS. 23 and 24.

DETAILED DESCRIPTION OF THE PREFERRED EMBODIMENTS

Figure 1:
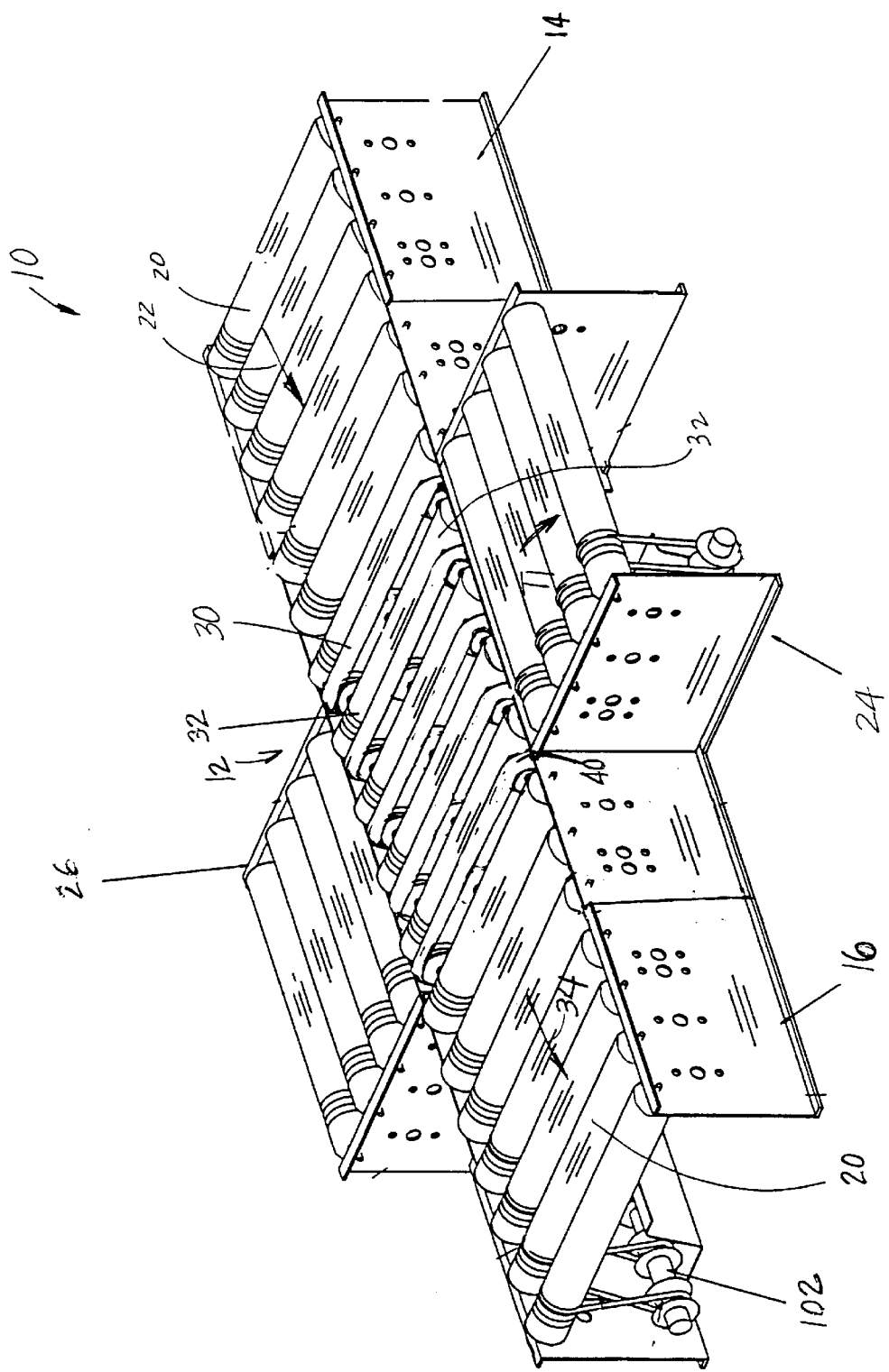
FIG. 1 is a perspective view of a conveyor system incorporating a transfer assembly of the present invention.

Referring to FIG. 1, the numeral 10 generally designates a conveyor system incorporating a transfer assembly 12 of the present invention. Conveyor system 10 includes in line conveyor sections 14 and 16 between which transfer assembly 12 is positioned for transferring articles that are conveyed along conveying surface 20 of conveyor sections 14 and 16. Articles are conveyed on conveying surface 20 in a conveying direction 22, with transfer assembly 12 transferring selected articles to a conveying surface of an adjacent take-away conveyor section, such as take-away conveyor section 24 or 26. Take-away conveyor sections 24 and 26 define opposed transfer directions T1 and T2, respectively, which are generally orthogonal to conveying direction 22, as would be understood by those skilled in the art. Though illustrated as roller conveyors, conveyor sections 14, 16, 24, and 26 may comprise belt driven roller conveyor sections or the like. As will be more fully described below, transfer assembly 12 exhibits improved retention of its respective transfer belts 30 in the transfer assembly thereby increasing the life expectancy of the transfer belts.

Figure 3:
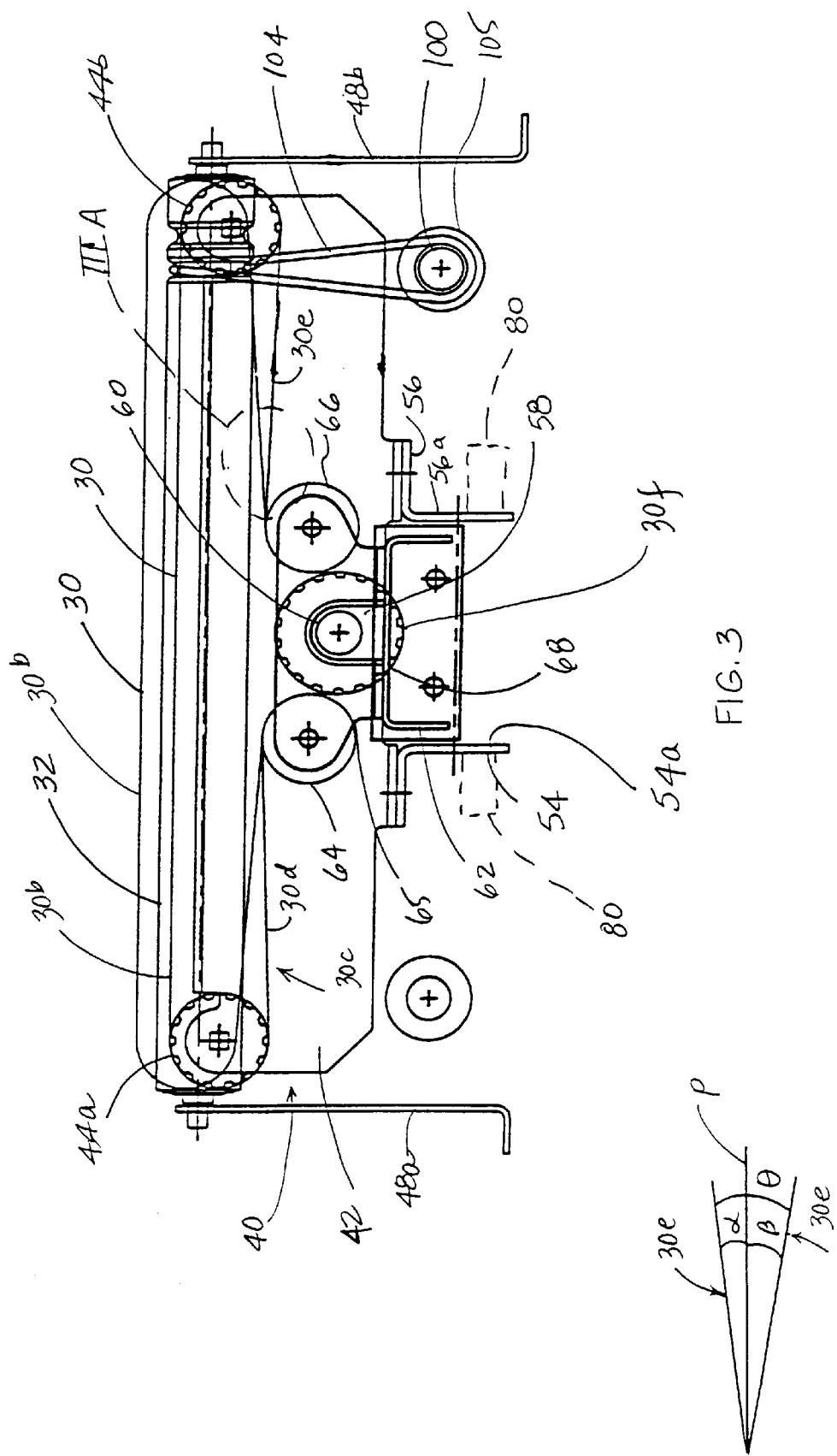
FIG. 3 is an end view of the transfer assembly of FIG. 1.
Figure 4:
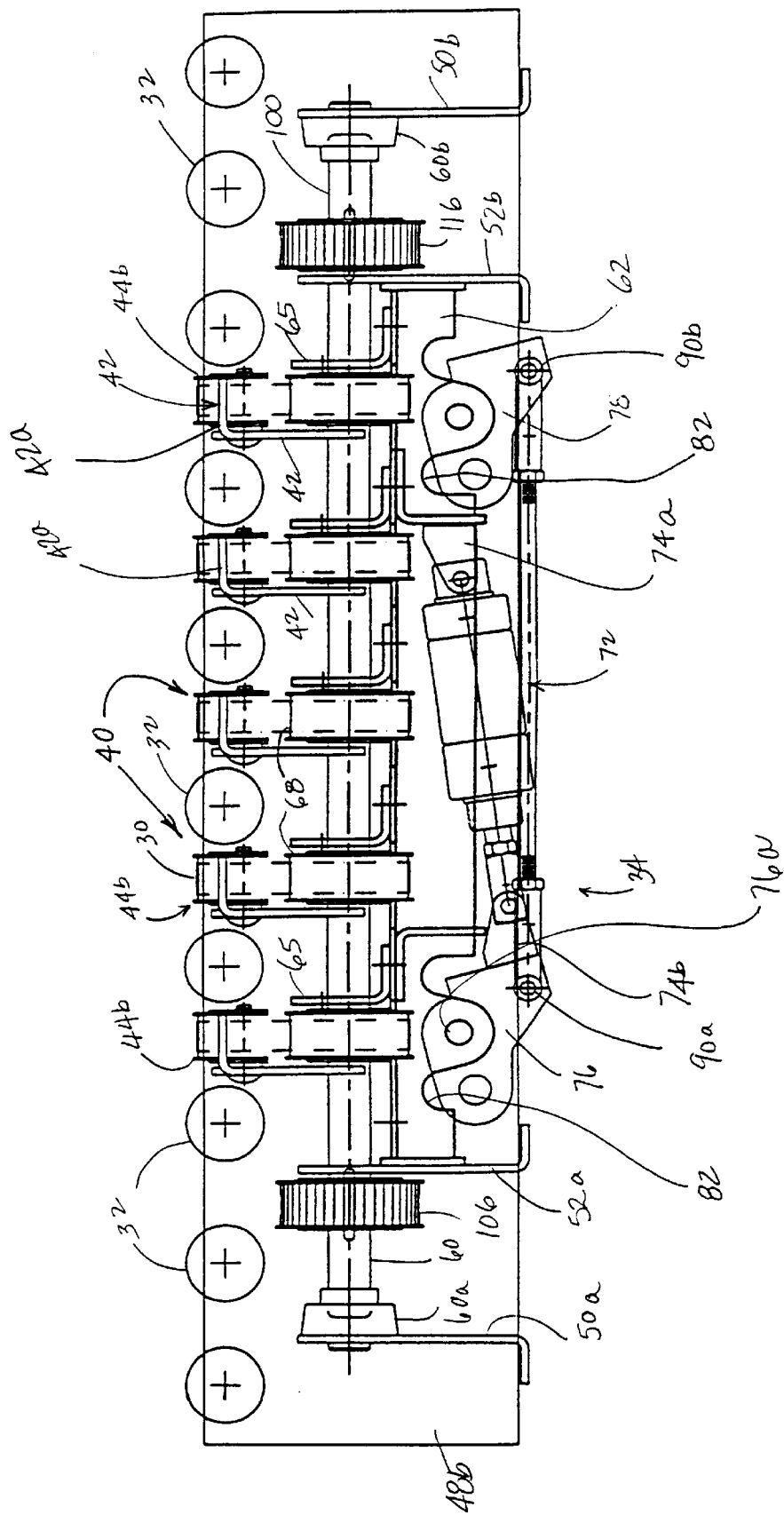
FIG. 4 is a side cross-section view taken along line IV—IV of FIG. 2 with the roller drive components removed and transfer belts shown in phantom for clarity.

Transfer assembly 12 includes a plurality of conveying devices, such as rollers 32, and a plurality of transfer belts 30, which are positioned between rollers 32 and are raised by an actuator or lift assembly 34 (FIGS. 4 and 5) to thereby lift an article or articles conveyed on the conveying surface defined by rollers 32 and transfer the article or articles in one of the transfer directions T1 or T2. Referring to FIGS. 3 and 4, transfer belts 30 are supported on transfer belt sheave assemblies 40, which are positioned between rollers 32. Referring to FIGS. 1 and 3, rollers 32 are supported between a pair of side frame members 48a and 48b, with a sheave assembly 40 positioned between each set of rollers 32. However, it can be appreciated that sheave assemblies 40 may be positioned between every other roller or the like.

As best seen in FIG. 3, each sheave assembly 40 includes a support member 42 on which a pair of belt sheaves or pulleys 44a and 44b are mounted and around which transfer belts 30 are driven to move the articles. Mounted to support members 42 are a pair of longitudinal support members 54 and 56 which provide a common support or frame for all of the sheave assemblies (40). Lift assembly 34 engages support members 54 and 56 to thereby move sheave assemblies 40 between an extended position in which the upper surfaces of transfer belts 30 are positioned slightly above rollers 32 for transferring articles generally orthogonal to conveying direction 22 and a position where the upper surfaces of belts 30 are slightly below the upper surface of rollers 32 whereby articles being conveyed on conveying surface 20 may continue to be conveyed in conveying direction 22 by rollers 32 for deposit on the conveying surface of conveyor section 16. In addition, as will be more fully described below, transfer belts 30 are moved over a reduced range of movement as compared to conventional transfer belts and, as a result, do not exhibit the same change in belt length as conventional transfer belts.

Referring again to FIG. 3, each support 42 includes a central opening 58 through which a belt drive shaft 60 extends. Shaft 60 is supported by shaft supports 60a and 60b (FIG. 2), such as bearings or the like, which mount to cross-frame or transverse frame members 50a and 50b which in turn mount to side frame members 48a and 48b. Extending between transverse or cross-frame members 52a and 52b is a longitudinal support member 62, which provides support for lift assembly 34 described more fully below. In the illustrated embodiment, support member 62 comprises an inverted channel member, but it should be understood that member 62 may have other configurations. Associated with each sheave assembly 40 are a pair of redirection pulleys 64 and 66, which direct the respective transfer belt (30) around a corresponding driven pulley or belt sprocket 68, which is mounted to driven belt shaft 60. Redirection pulleys 64 and 66 are mounted to support 62 by a bracket 65. In this manner, sheaves or pulleys 64 and 66 are supported in a fixed location. Each transfer belt 30 forms a closed loop around pulleys 44a, 44b and pulley 68. As best seen in FIG. 3, each belt 30 extends over pulleys 44a and 44b and over pulleys 64, 66, and under pulley 68. Therefore, when shaft 60 is driven, belt 30 is driven in a closed loop with clockwise rotation of shaft 60 inducing the transferring portion of belt 30 to move to the right (as viewed in FIG. 3) and counter-clockwise movement of shaft 60 inducing the transferring portion of belt 30 to move to the left (as viewed in FIG. 3).

Figure 5:
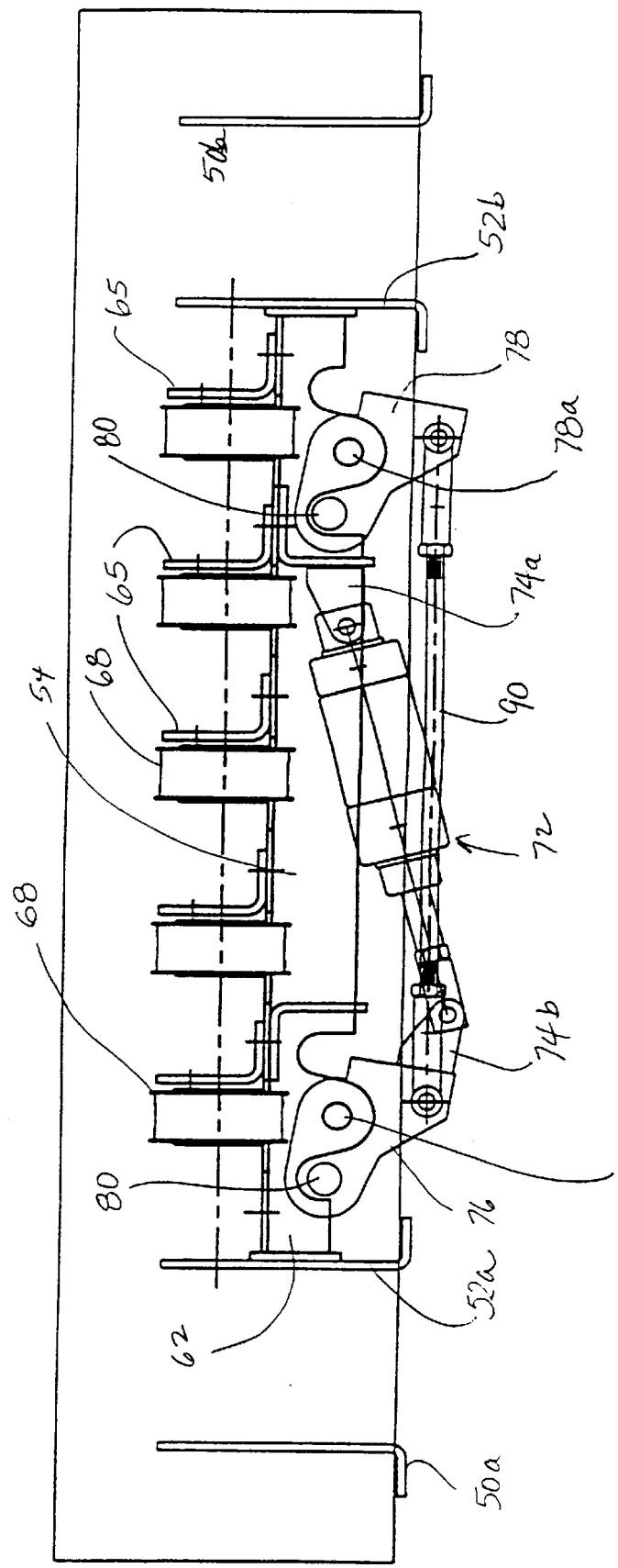
FIG. 5 is a similar view to FIG. 4 illustrating the lift assembly of the belt sheave assembly.

Referring again to FIGS. 4 and 5, belts 30 are moved between their transfer position and non-transfer position by lift assembly 34. Referring to FIGS. 4, 5, 7, and 8–10, lift assembly 34 includes a driver, such as a cylinder 72, which is attached on one end to the longitudinal support member 62 by a mounting bracket 74a (FIG. 5). The driver may alternatively comprise a motor, such as a servo motor, gear motor, linear motor or other mechanical actuator driven by the drive shaft.

Cylinder 72 may comprise a pneumatic cylinder or a hydraulic cylinder. Cylinder 72 is pivotally mounted on its rod end to a mounting bracket 74a which mounts to a linkage member 76. Referring again to FIGS. 4, 5, 7, and 8–10, linkage member 76 comprises a U-shaped member and is pivotally mounted at its flanges to the flanges of support member 62 by a transverse pin 76a. Linkage member 76 is coupled to a second linkage member 78, which also comprises a U-shaped member and which is pivotally mounted at its flanges by a transverse pin 78*a* to the flanges of longitudinal support member 62. Linkage members 76 and 78 are drivingly coupled by a pair of rods 90, such as tie rods. Rods 90 are pinned at both ends to linkage members 76 and 78 by pins 90*a* and 90*b*, respectively, which are eccentric to pins 76*a* and 78*a* so that pivotal movement of linkage 76 induces linear movement in rod 90, which in turn induces pivotal movement of linkage 78 about pin 78*a*. In this manner, when cylinder 72 is actuated to extend, linkage member 76 will pivot about pin 76*a* in a counter-clockwise direction, which will in turn cause rod 90 to pivot linkage 78 in a counter-clockwise direction. Rods 90 may be a fixed length rod (FIG. 8A) or an adjustable rod, with one end or both ends being adjustable by turn buckles, for example, as would be understood by those skilled in the art.

Referring to FIGS. 7 and 8, each linkage member 76 and 78 includes a lifter or drive pin 80. Lifter or drive pins 80 extend through the downwardly extending legs 54*a*, 56*a* of support members 54, 56 (FIG. 3). In this manner, lift assembly 34 supports sheave assemblies 40 by way of longitudinal support members 54 and 56 at two points, which maintains sheave assemblies 40 (and, in turn, belt 30) substantially level. Therefore, when cylinder 72 is actuated to extend, the rod end of cylinder 72 rotates linkage members 76, 78 about pins 76*a*, 78*a* to urge lifter pins 80 to lift support members 54 and 56 which in turn lift sheaves 44*a* and 44*b* and belts 30 and to raise belts 30 so that their upper surfaces 30*a* are extended above the upper surface of rollers 32 and move transfer belts 30 to their transferring position. Similarly, when cylinder 72 is actuated to retract, its rod end will contract and rotate linkage members 76, 78 about pins 76*a*, 78*a* in a counter-clockwise (as viewed in FIG. 4) direction to thereby lower lifter pins 80 and in turn lower sheave assemblies 40 so that upper surfaces 30*a* of transfer belts 30 are below the upper surface or conveying surface of rollers 32.

As best seen in FIGS. 5, 7, and 8, longitudinal support member 62 includes slotted openings 82 in its flanges to accommodate the relative movement of pins 80. In this manner, the overall height of the lift assembly can be minimized. As a result, the cylinder's stroke limits the movement of transfer assembly 40.

Referring again to FIG. 3, each transfer belt 30 includes a generally horizontal upper belt portion 30*b* and a lower portion 30*c* which includes two generally horizontal belt portions 30*d* and 30*e*. Lower belt portion 30*c* extends over pulley 64 and around and below pulley 68 and over pulley 66 to form generally U-shaped portion 30*f* in between generally horizontal portions 30*d* and 30*e*. When lift assembly 34 is actuated, generally horizontal portions 30*d* and 30*e* move between a position slightly below a horizontal reference plane P and a position just slightly above reference plane P (FIG. 3A). Referring to FIG. 3A, for example, generally horizontal portion 30*e* (and 30*d*) moves from its lower position through an arc θ in a range of about −2° to 4° between its lowered position and its raised position for a twenty-four inch wide transfer assembly. For smaller transfer assemblies, such as eighteen inch wide transfer assemblies, the angle may range from about −3.6° to +7°. This angular motion may be even smaller for wider transfer assemblies, such as thirty or thirty-six inch transfer assemblies. In addition, horizontal plane P forms an angle β with respect to belt portion 30*e* when belt portion is in its lower position and an angle α with respect to belt portion 30*e* when it is in its upper position. Preferably, angle α is slightly larger than angle β so that the belt is tightest when transferring. By minimizing the change in belt path length, the stretch of transfer belt 30 is minimized. For example, in the present invention, the change in belt length of transfer belt 30 is less than one inch, optionally less than three-quarters of an inch, and may be less than one-half inch. Optimally, the change in belt length is less than a quarter of an inch and, more optimally, is about one thirty-second of an inch or less. In this manner, the material forming transfer belt 30 may be reinforced, such as by polyester reinforcement, a steel core reinforcement, such as steel cords or cables, a fiberglass reinforcement, a Kevlar® reinforcement, or the like. As a reinforced belt, which is relatively stiff compared to conventional elastomeric type transfer belts, transfer belt 30 exhibits significantly increased resistance to being displaced or deformed by the impact from the articles being transferred.

Figure 2:
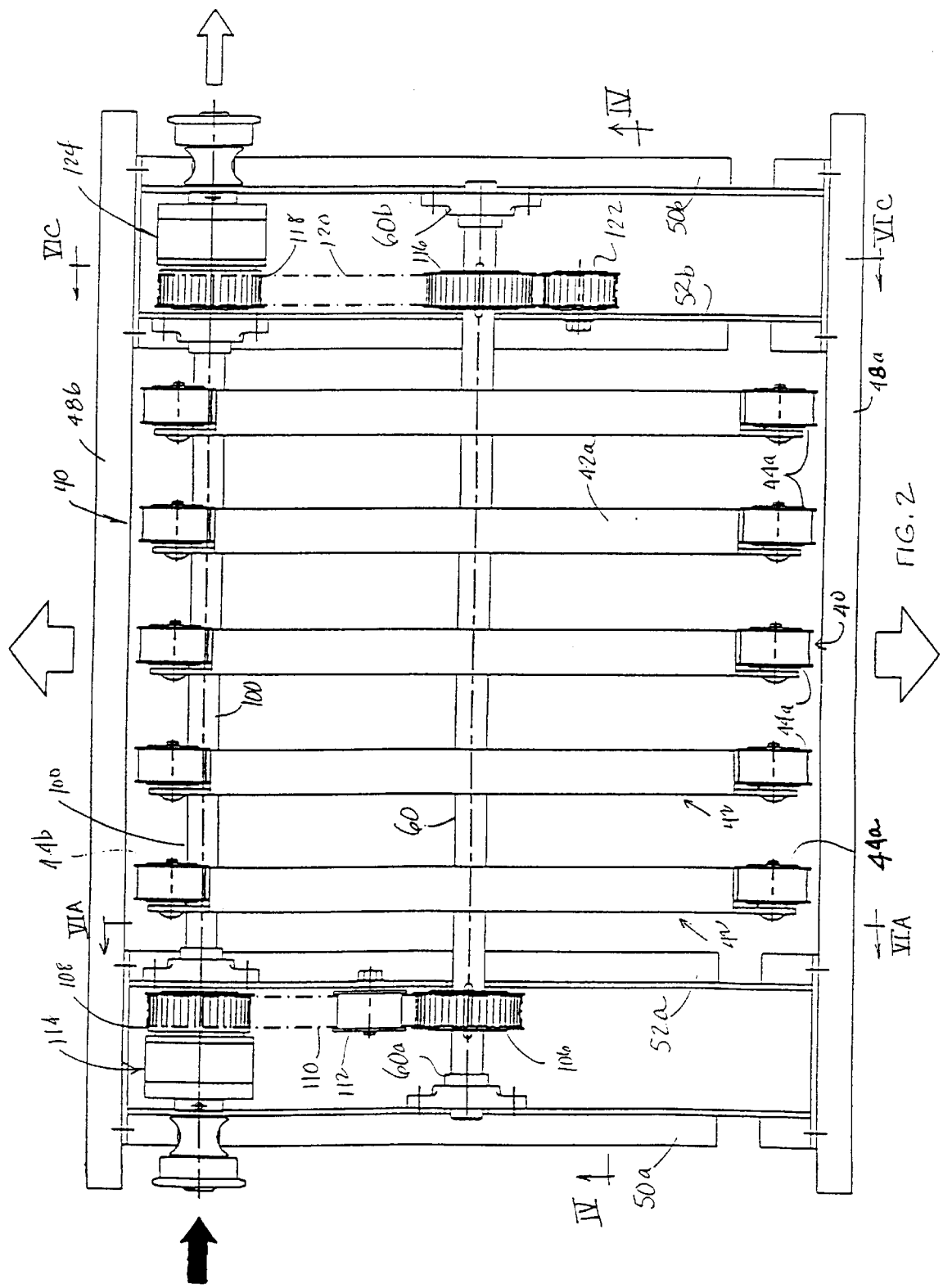
FIG. 2 is a top plan view of the transfer assembly of FIG. 1 with the rollers and transfer belt removed for clarity.

As best understood from FIGS. 2 and 3, rollers 32 are driven by a main line shaft 100, which extends through transfer assembly 12 and drivingly couples to the main line shaft 102 of adjacent conveyor sections 14 and 16. Shaft 100 is supported by bearings 100*a* and 100*b* in transverse support 52*a* and 52*b*. Rollers 32 are driven by drive belts 104 which are mounted in grooves formed in rollers 32 and in sheaves 105 mounted on shaft 100. Shaft 60 is also driven by main drive shaft 100, as will be more fully described below.

Figure 6:
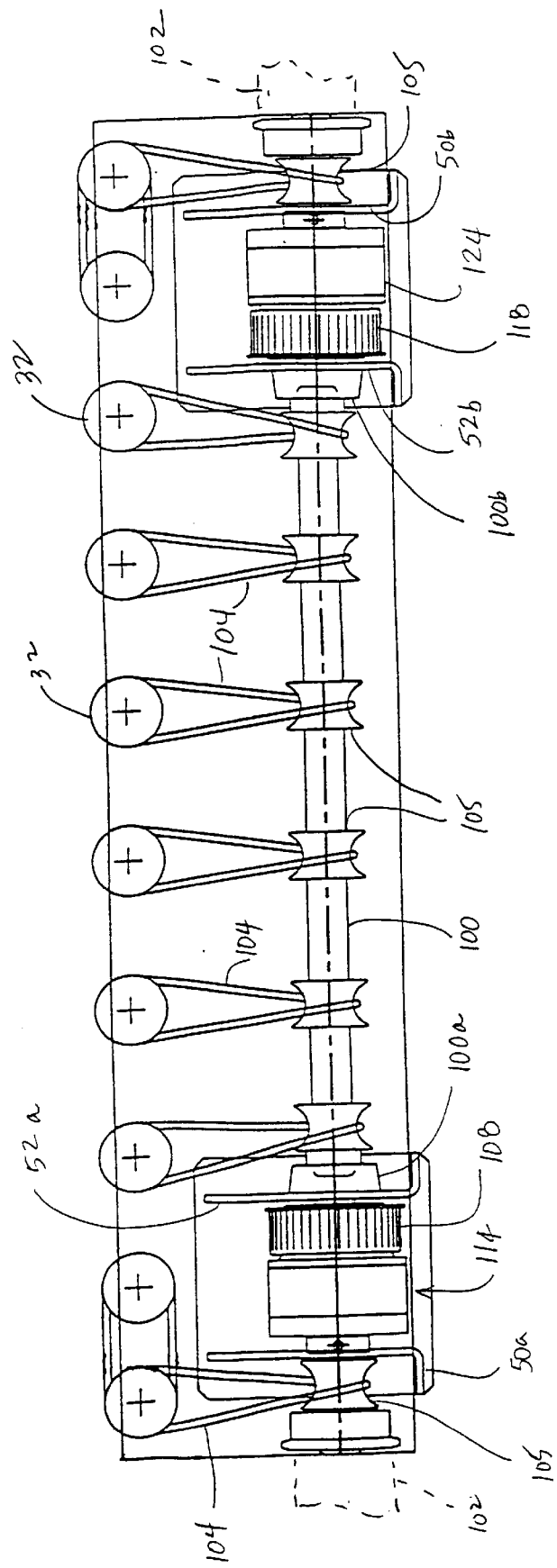
FIG. 6 is a similar view to FIG. 4 illustrating the rollers and the roller drive assembly.
Figure 6A:
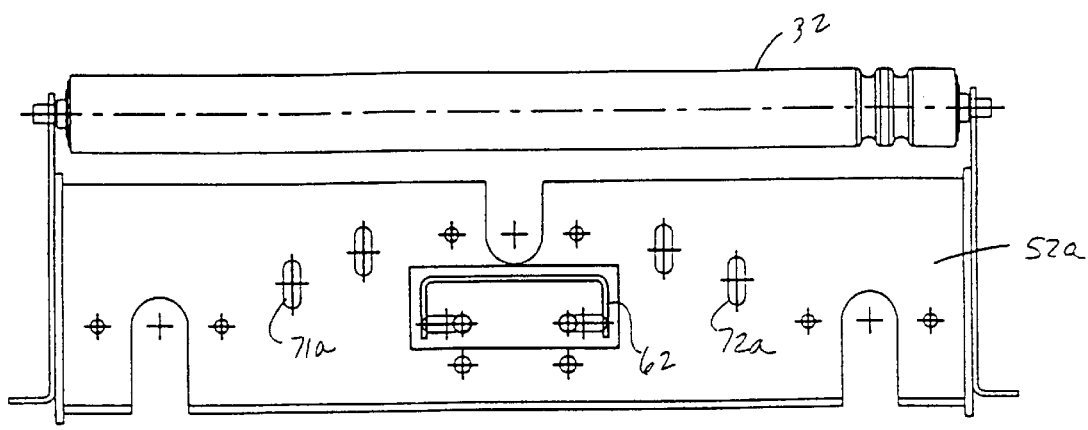
FIG. 6A is a cross-section view taken along line VIA—VIA of FIG. 2.
Figure 6B:
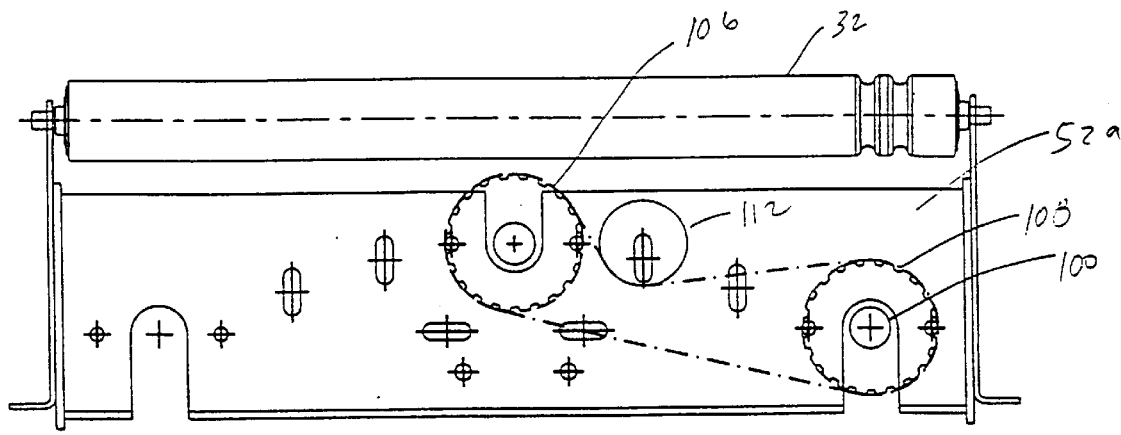
FIG. 6B is a similar view to FIG. 6A illustrating a roller and a portion of the drive assembly.

Referring to FIGS. 2 and 6B, shaft 60 includes a driven pulley 106, such as a timing belt sprocket, which is coupled by a belt 110, such as a timing belt or cog belt, to a corresponding drive pulley 108, such as a timing belt pulley or sprocket, which is mounted on shaft 100. In this manner, when shaft 100 is driven in a clockwise direction (as viewed in FIG. 6B), shaft 60 will similarly rotate in a clockwise direction. When shaft 60 rotates in a clockwise direction, belt 30 will similarly be driven about pulleys 44*a* and 44*b* so that the transferring portion of transfer belt 30 moves to the right as viewed in FIG. 3 to provide a right-handed transfer (as viewed in FIG. 1). Optionally, belt 110 is tensioned by an adjustable tensioner pulley 112, which is mounted to transverse support 52*a* in a slotted opening.

Driven pulley 106 may be selectively driven by shaft 100 by an actuator 114, which selectively drives or disengages from drive pulley 108. In the illustrated embodiment, actuator 114 comprises a clutch assembly which is mounted on shaft 100. Clutch assembly 114 optionally comprises an air actuated clutch and permits selective actuation of transfer assembly 12.

Figure 6C:
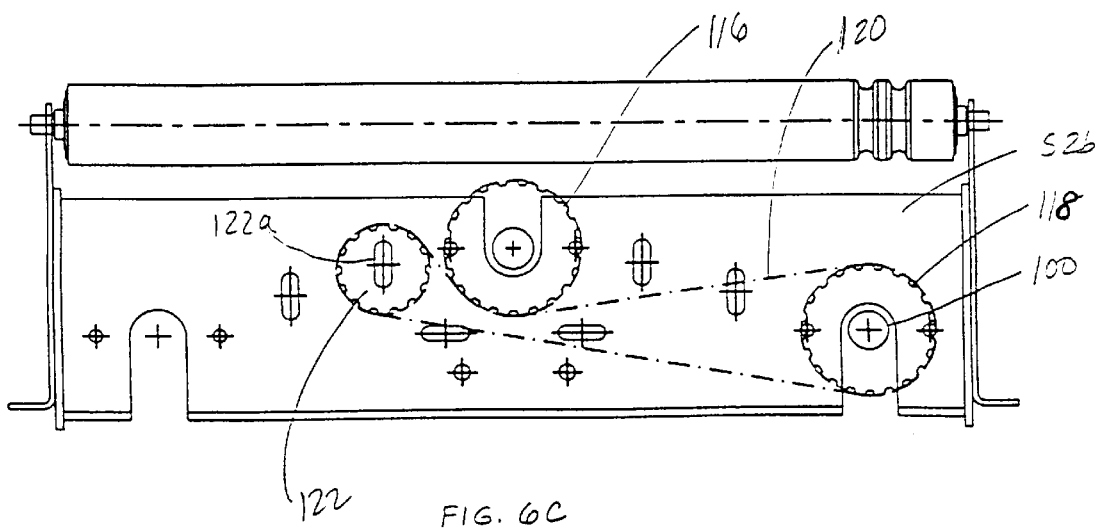
FIG. 6C is a cross-section view taken along line VIC—VIC of FIG. 2.
Figure 9:
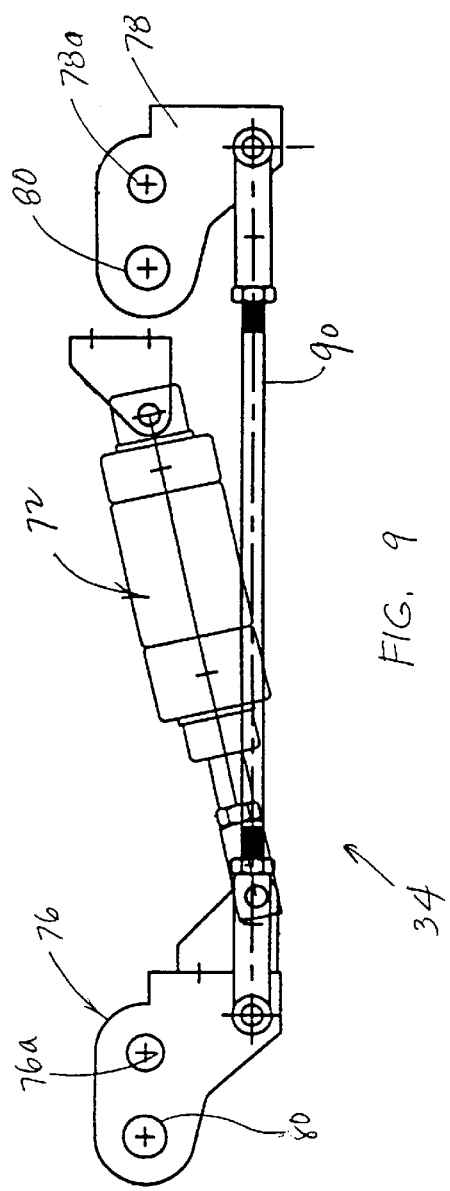
FIG. 9 is an elevation of the lift assembly.
Figure 10:
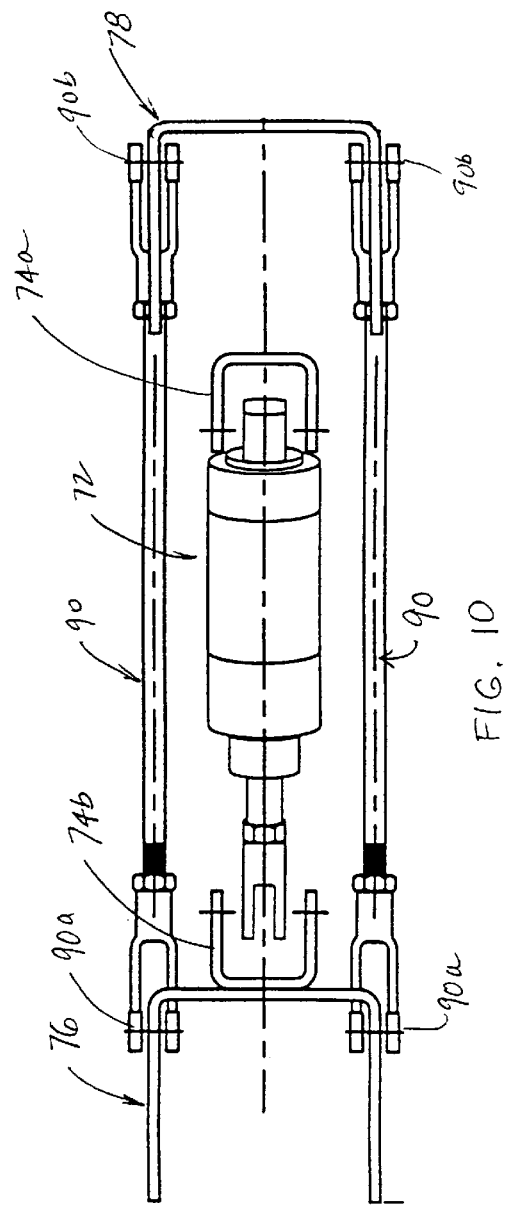
FIG. 10 is a plan view of the lift assembly of FIG. 9.

Referring again to FIG. 2, belt shaft 60 includes a second driven pulley 116 which is drivingly coupled to shaft 100 by a second drive pulley 118 and belt 120. As best seen in FIG. 6C, belt 120 extends around drive pulley 118 and, further, around a redirection pulley 122 to form a closed loop with an upper leg of the loop contacting and driving driven pulley 116. Similar to pulley 112, pulley 122 is vertically adjustable to provide adjustment to the tension of belt 120. Redirection pulley 122 is mounted to transfer support 52*b* and, optionally, mounted in a slotted opening 122*a* in support 52*b* so that the tension on belt 120 may be adjusted. Pulley 122 is positioned so that belt 120 extends around a lower portion of driven pulley 116 to thereby rotate shaft in a counter-clockwise direction when shaft 100 is rotated in a clockwise direction. Furthermore, shaft 100 may include a second clutch assembly 124 which selectively engages drive pulley 118 to thereby drive driven pulley 116 in an opposite direction than the belt transmission that drives pulley 106 to provide a left-hand transfer (as viewed in FIG. 1). In this manner, clutch assemblies 114 and 124 control when and in which direction transfer assembly 12 is transferring articles.

Clutch assemblies 114 and 124 may comprise pneumatic clutches or hydraulic clutches as previously noted. Clutch assemblies 114, 124 may incorporate balls which engage corresponding dimples or recesses formed in the clutch plate, which would provide a greater torque transmission ability. Alternately, clutches assemblies 114, 124 may incorporate conical friction surfaces. In addition, clutch assemblies 114 and 124 may be combined to form a double clutch with the respective drive sheaves 108 and 118 positioned on either side of the clutch assembly. Furthermore, when clutch assemblies 114 and 124 comprise pneumatic clutches, actuation of clutch assemblies 114 and 124 may be controlled by a common pneumatic system that controls cylinder 72. To provide even further increased torque, clutch assemblies 114 and 124 may comprise clutch assemblies that incorporate radial teeth that engage corresponding notches or grooves in the clutch plate and, further, may incorporate a synchronizer (such as will be more fully described in reference to FIGS. 18A and 18B) so that the teeth will be properly aligned with the respective notches on the clutch plate.

Referring to FIGS. 11A and 11B, an alternate embodiment 34' of the lift assembly of the present invention is illustrated. Lift assembly 34' includes a cylinder 72' which is pivotally mounted on one end by a bracket 74a' to the web 62a' of longitudinal support 62'. The rod end of cylinder 72' is pivotally mounted by a mounting bracket 74b', which in turn is mounted to a linkage member 76'. Similar to the previous embodiment, linkage member 76' is pivotally mounted by a pin 76a' to longitudinal support 62', for example to its downwardly extending flanges 62b'. Linkage member 76' is then coupled to a second linkage member 78' by a rod 90'. Thus, when linkage member 76' is pivoted about pivot pin 76a', linkage member 78' will pivot about its respective pivot pin 78a'. Linkage member 76' and 78' both include lifter pins 80' which mount to the respective longitudinal support members (not shown) of the sheave assemblies to thereby lift the sheave assemblies upon actuation of cylinder 72'. In contrast to the previous embodiment, extension of cylinder 72' lowers lift pins 80', while contraction of cylinder 72' raises lifter pins 80'.

Referring to FIGS. 12–17, several cross-sections of transfer belt 30 are illustrated. Referring to FIGS. 12 and 12A, transfer belt 30 includes a generally rectangular cross-section having a width greater than its height. Optionally, belt 30 includes a plurality of projecting teeth 30' which project upwardly from its driving surface. In addition, belt 30 may include a second plurality of projecting teeth 30" which extend or project from the driven surface of transfer belt 30. Projecting teeth 30' and 30" may have similar profiles or may have varying profiles. For example, projecting teeth 30" may extend across the fill width of transfer belt 30 while projecting teeth 30' may extend only partially across the width of belt 30. Furthermore, teeth 30' may have a greater height dimension.

Referring to FIG. 12A, each sheave assembly may incorporate a track or rail 131 to retain transfer belt in the rail to even further enhance the retention of the transfer belt. In the illustrated embodiment, rail 131 comprises a generally U-shaped member with inwardly projecting flanges 132 which extend over the perimeter edges of transfer belt 30. In addition, projecting teeth 30' are sized to project between and above inwardly projecting flanges 132 to thereby provide contact with the articles being transferred. Rail 131 may be mounted to support 42 between sheaves 44a and 44b on an angled portion 42a of support 42 (FIG. 4). Rail 131 may extend over the full length of transfer belt 30 between sheaves 44a and 44b or may extend only over a portion of the length of the transfer belt.

Referring to FIG. 13, belt 230 also includes a plurality of projecting teeth 230" that project from its driven surface. Upper surface 230a of belt 230 is substantially planar over its transfer surface. Referring to FIG. 13A, each sheave assembly may incorporate a track or rail 231 which comprises a generally inverted U-shaped member with upper surface 230a of belt 230 projecting above flanges 232 of track 231. Similar to the previous embodiment, track 231 may be supported on flange 42a of support 42 and may extend over the full length of the transfer belt between sheaves 44a and 44b or may extend over just a portion of the transfer belt.

Referring to FIG. 14, transfer belt 330 includes a plurality of projecting teeth 330" that project from the driven surface of transfer belt 330 and a projecting rib 330' that projects from the driving surface or the transfer surface of belt 330. Similar to belt 30, projecting teeth 330" may span the full width of belt 330, while projecting rib 330' spans only over a portion of the width of belt 330. In this manner, belt 330 may be supported in a rail 331', similar to rail 131 (FIG. 14B), or may be supported in rail 331, which is similar to rail 231 but with extended flanges 332. Again, track or rail 331 may be supported on flange 42a of the respective supports 42 of the sheave assemblies.

Referring to FIG. 15, transfer belt 430 includes upper and lower projecting teeth 430' and 430" (as viewed in FIG. 15) which have generally equal height but varying width dimensions. For example, projecting teeth 430" extend over the full width of belt 430, whereas projecting teeth 430' extend over a portion of the belt's width. In this manner, belt 430 may be supported in a track 431, which is of similar construction to track 131.

Referring to FIG. 16A, transfer belt 530 includes a plurality of projecting teeth 530' and 530", with projecting teeth 530' projecting from the driving or transfer surface of belt 530 and teeth 530" projecting from the driven surface of belt 530. In the illustrated embodiment, projecting teeth 530' and 530" span the fill width of belt 530. In addition, belt 530 may be supported in a track 531, which includes a generally U-shaped cross-section similar to track 231 with flanges 532 which project upwardly just below upper surface of rib 530'.

Referring to FIG. 17, the number 930 designates another embodiment of the transfer belt. Belt 930 includes a generally planar upper surface 930' and a downwardly projecting central rib 930". Rib 930" extends over only a portion of the width of belt 930 and is used to guide belt 930 in rail 931. Rail 931 includes a base or web 931a with a groove 931b for receiving rib 930". Groove 931b has a similar cross-section or profile as rib 930 so that rail 931 guides belt 930. In the illustrated embodiment, rib 930" has a generally V-shaped or trapezoidal-shaped cross-section.

In addition, belt 930 includes a plurality of spaced downwardly projecting ribs 930a" which extend over the full width of belt, but with rib 930" extending below ribs 930a". Ribs 930a" ride on an upper surface 931c of track adjacent groove 931b, while upper planar surface 930' extends above track 931 between upwardly extending flanges 931d of track 931.

Although described as a rectangular cross-section belt, transfer belt may comprise a round transfer belt or may comprise a non-rectangular and non-round belt, such as disclosed in co-pending U.S. Pat. application entitled CONVEYOR TRANSFER ASSEMBLY, Ser. No. 09/831,210, filed May 31, 2000 (Attorney Docket RAP04 P-581A), which is incorporated by reference herein in its entirety.

Figure 18:
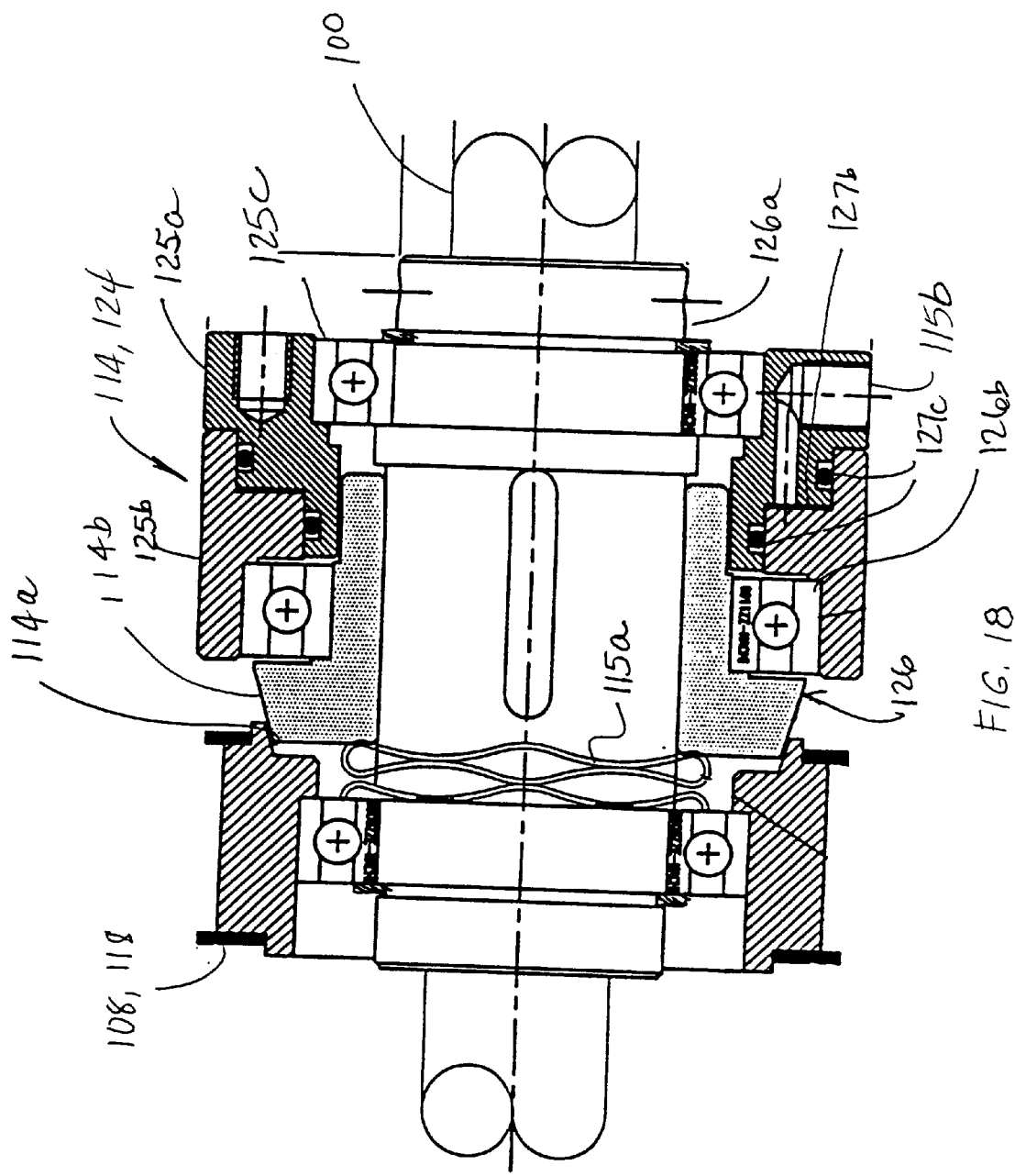
FIG. 18 is an enlarged cross-section view of the clutch of FIG. 6.

Referring to FIG. 18, clutch assemblies 114, 124 include an inner cylinder ring 125a, an outer cylinder ring 125b, and a clutch plate 126. Inner cylinder ring 125a is mounted on clutch shaft sleeve 126a by bearings 125c. Clutch plate 126 is coupled to shaft sleeve 126a, which is mounted on and keyed to shaft 100. Therefore, when shaft 100 is driven, clutch plate 126 will spin with shaft 100. Clutch plate 126 is mounted to outer cylinder ring 125b by bearings 126d so that clutch plate 126 is free to rotate with respect to both cylinder rings 125a and 125b. Outer cylinder ring 125b is movably mounted on inner ring 125a and is adapted to move with respect to inner cylinder ring 125a in an axial direction (relative to the shaft) and is selectively urged toward clutch plate 126 so that clutch plate 126 will contact pulley 108. Outer cylinder ring 125b is selectively moved toward clutch plate 126 by a fluid, such as air, that is applied to its facing surface 127b from an inlet 115b formed in inner cylinder ring 125a. Seals 127c, such as O-ring seals, are provided between inner and outer cylinder rings 125a and 125b on either side of facing surface 127b. In the illustrated embodiment, clutch plate 126 and timing belt pulley 108 have conical friction faces 114a, 114b which are separated by a spring 115a, but as noted above, are urged into engagement by fluid pressure from inlet port 115b, which selectively overcomes the spring force of the spring 115a when pulley or sheave 108, 118 is to be driven.

Optionally, as noted previously, clutch assemblies 114, 124 may comprise a clutch assembly 1114 (illustrated in FIGS. 18A and 18B), which incorporates spline teeth 1126b (FIG. 18B) on its friction face 1114a to provide increased torque transmission capability for the clutch assembly. Clutch assembly 1114 may incorporate a synchronizer 1129 (FIG. 18A) which aligns the teeth with the respective grooves or recesses formed in the opposing face.

Figure 18A:
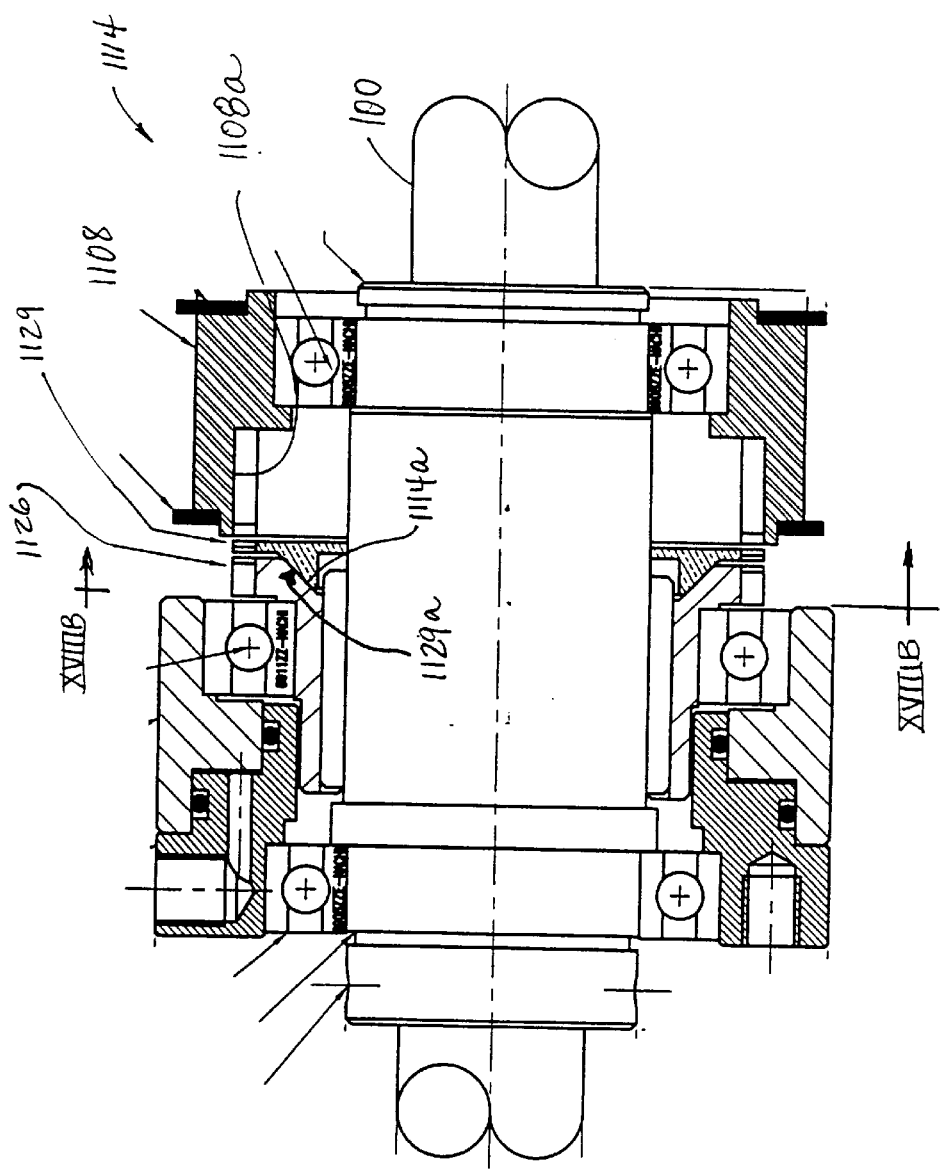
FIG. 18A is a similar view to FIG. 18 of another embodiment of a clutch of the present invention.
Figure 18B:
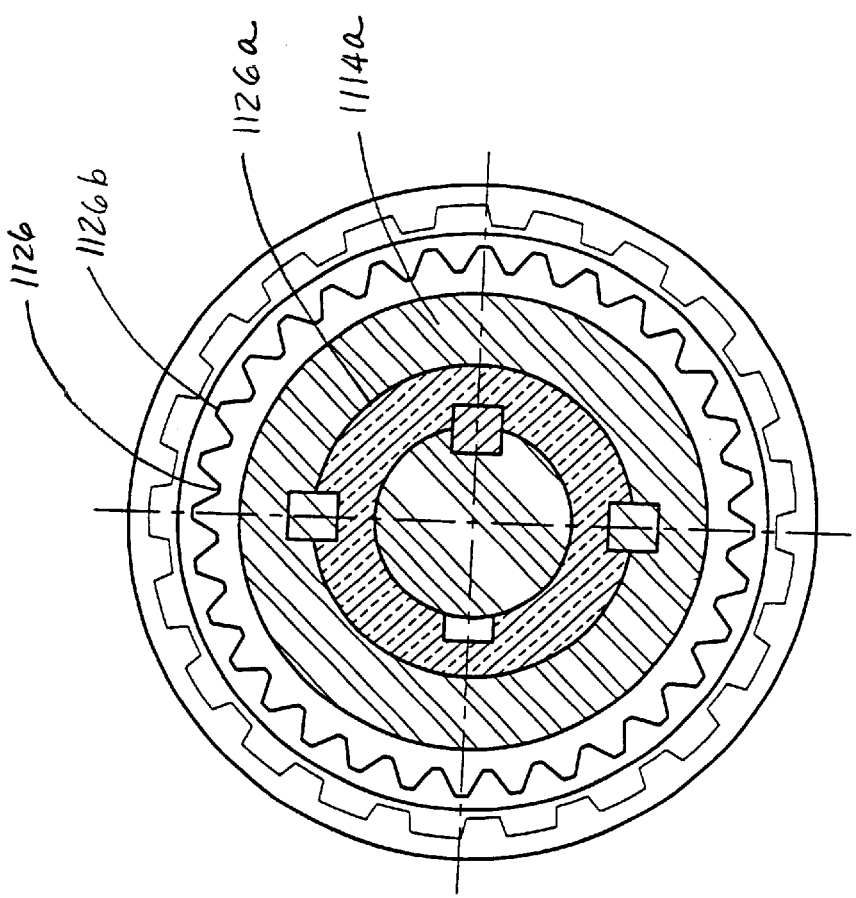
FIG. 18B is a cross-section taken along line XVIIIB—XVIIIB of FIG. 18A.

Referring to FIG. 18A, synchronizer 1129 is positioned between clutch plate 1126 and timing belt pulley 1108. In this embodiment, timing belt pulley 1108 includes internal spline teeth 1108a for aligning with teeth 1126b of clutch plate 1126. As previously noted, alignment of respective teeth can be achieved by synchronizer 1129. Synchronizer 1129 synchronizes the speed of shaft sleeve 1126a and pulley 1108 by friction. Once the speeds of the two members are matched, the spline teeth can be slid together without damage. Once engaged, the spline teeth can transmit large torques compared to a friction clutch of the same size. Preferably, engagement of the two sets of spline teeth takes place before any appreciable torque transmission is required.

Figure 19:
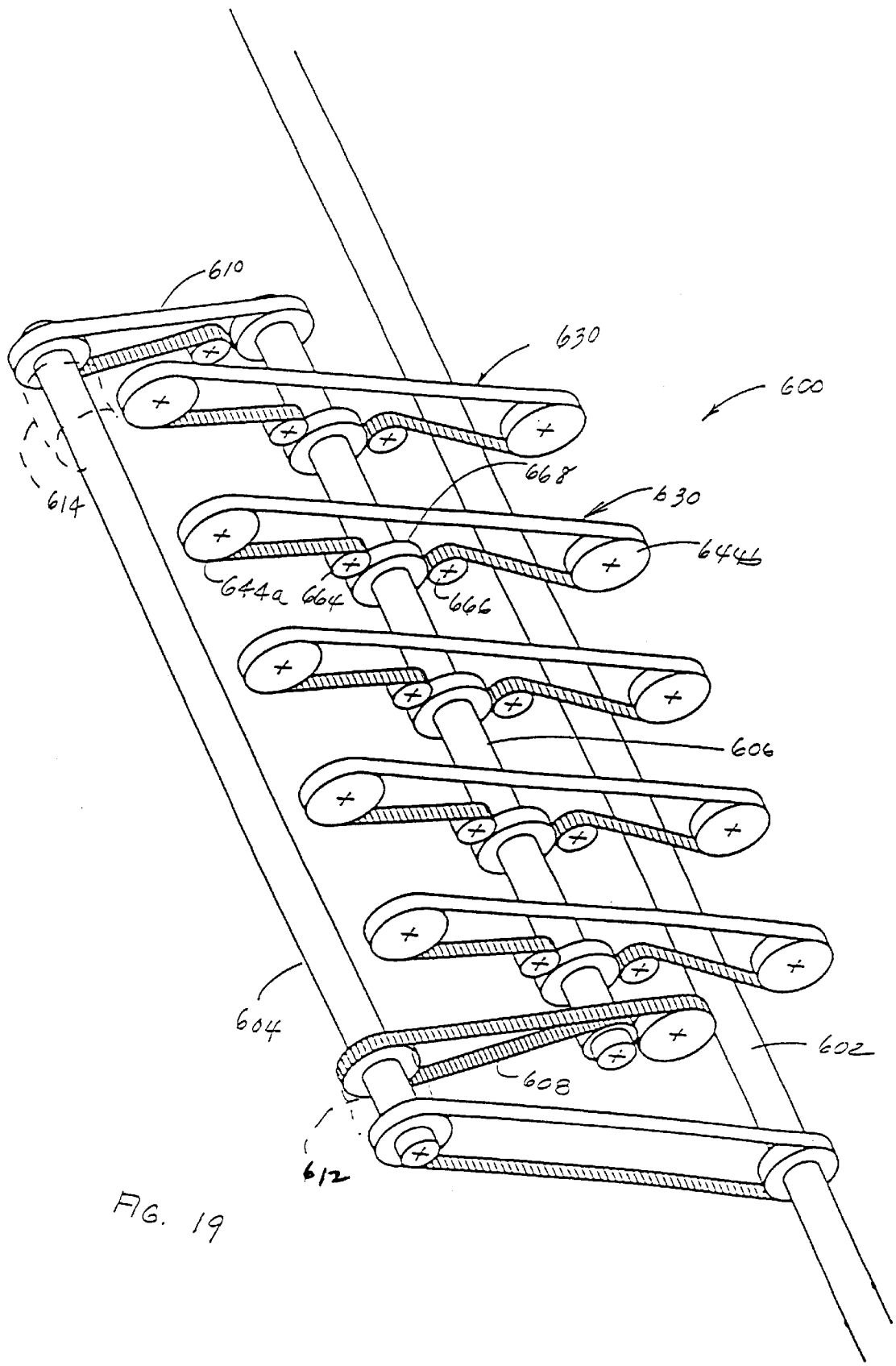
FIG. 19 is a schematic perspective view of an alternate drive arrangement of the transfer assembly of the present invention.

Referring to FIG. 19, transfer assembly 12 may include a drive system 600 which comprises a main drive shaft 602 and an auxiliary shaft 604 which is driven by main drive shaft 602. Auxiliary shaft 604 selectively drives the driven belt shaft 606 by way of one of two belts 608 or 610 with each belt being selectively drivingly engaged with auxiliary shaft 604 through a clutch mechanism 612 or 614 (shown in phantom), respectively. Similar to the previous embodiment, the transfer belt 630 is supported by at least two sheaves or pulleys 644a, 644b and forms a closed loop around a driven sheave 668, which is mounted to shaft 606. For further details of transfer belt 630 and sheaves 664, 666, and 668, reference is made to the first embodiment. Therefore, belt 630 exhibits the same limited amount of stretch; thus, eliminating the need for belt tensioners. As noted previously, with the present belt path design, the transfer belt is less likely to be lifted off sheaves 644a, 644b since it is relatively stiff compared to conventional transfer belts which are generally flexible and tend to roll out of their respective sheaves.

Figure 20:
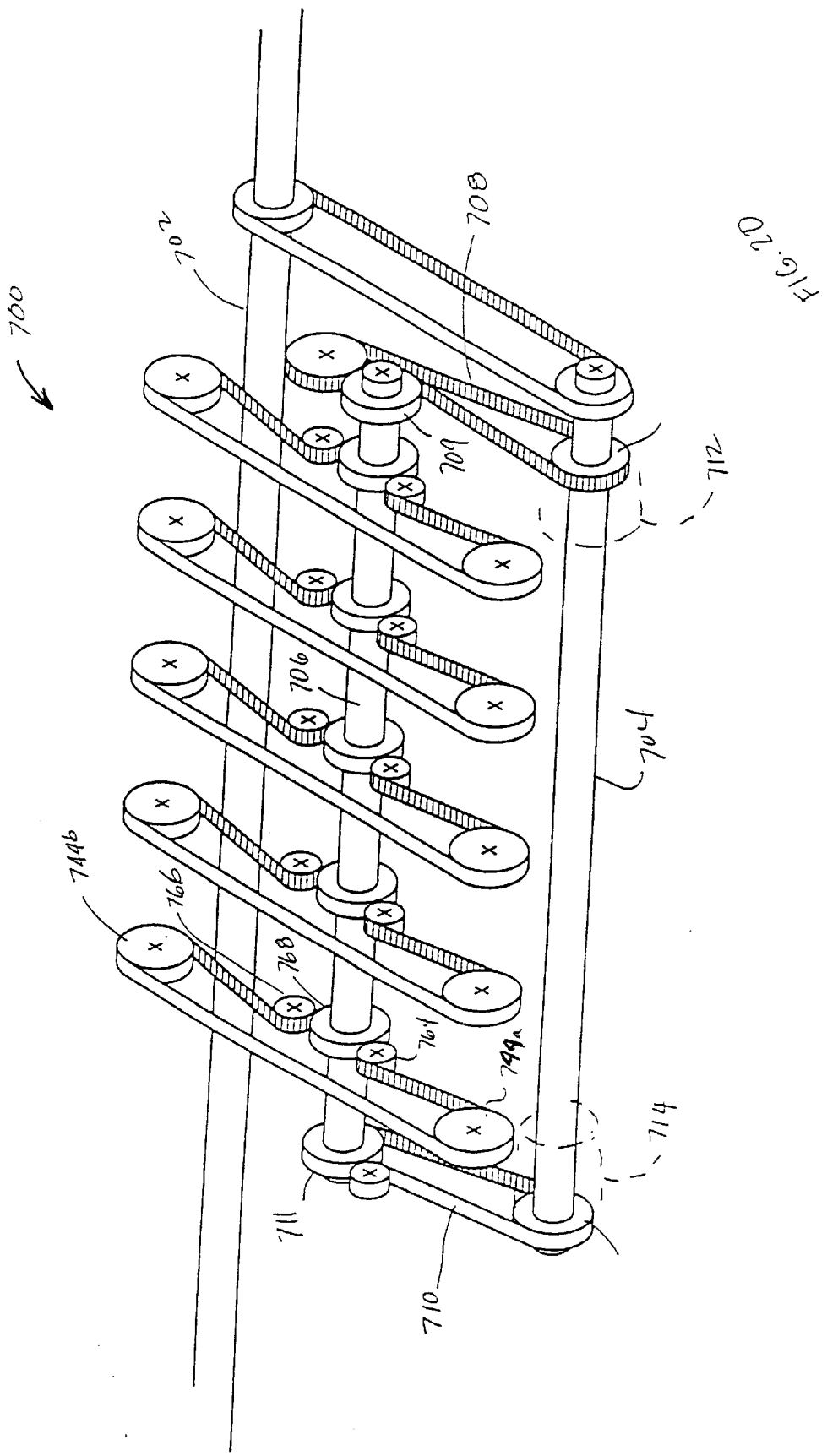
FIG. 20 is a similar view to FIG. 19 of another alternate embodiment of the drive assembly of the present invention.

Referring to FIG. 20, the numeral 700 generally designates another embodiment of the drive assembly of the present invention. The drive assembly includes a main line drive shaft 702 and an auxiliary shaft 704 similar to the previous embodiment. Auxiliary shaft 704 selectively drives driven belt shaft 706 by a pair of drive belts 708 and 710, also similar to the previous embodiment. However, drive belt 708 extends under driven belt shaft 706 whereby clockwise rotation of auxiliary shaft 704 will induce counter-clockwise rotation of shaft 706. By the same token, drive belt 710 extends around driven belt shaft 706 and engages a sheave or a pulley 711, which is mounted to driven belt shaft 706 to thereby drive driven belt shaft 706 in an opposite direction from belt 708.

Figure 21:
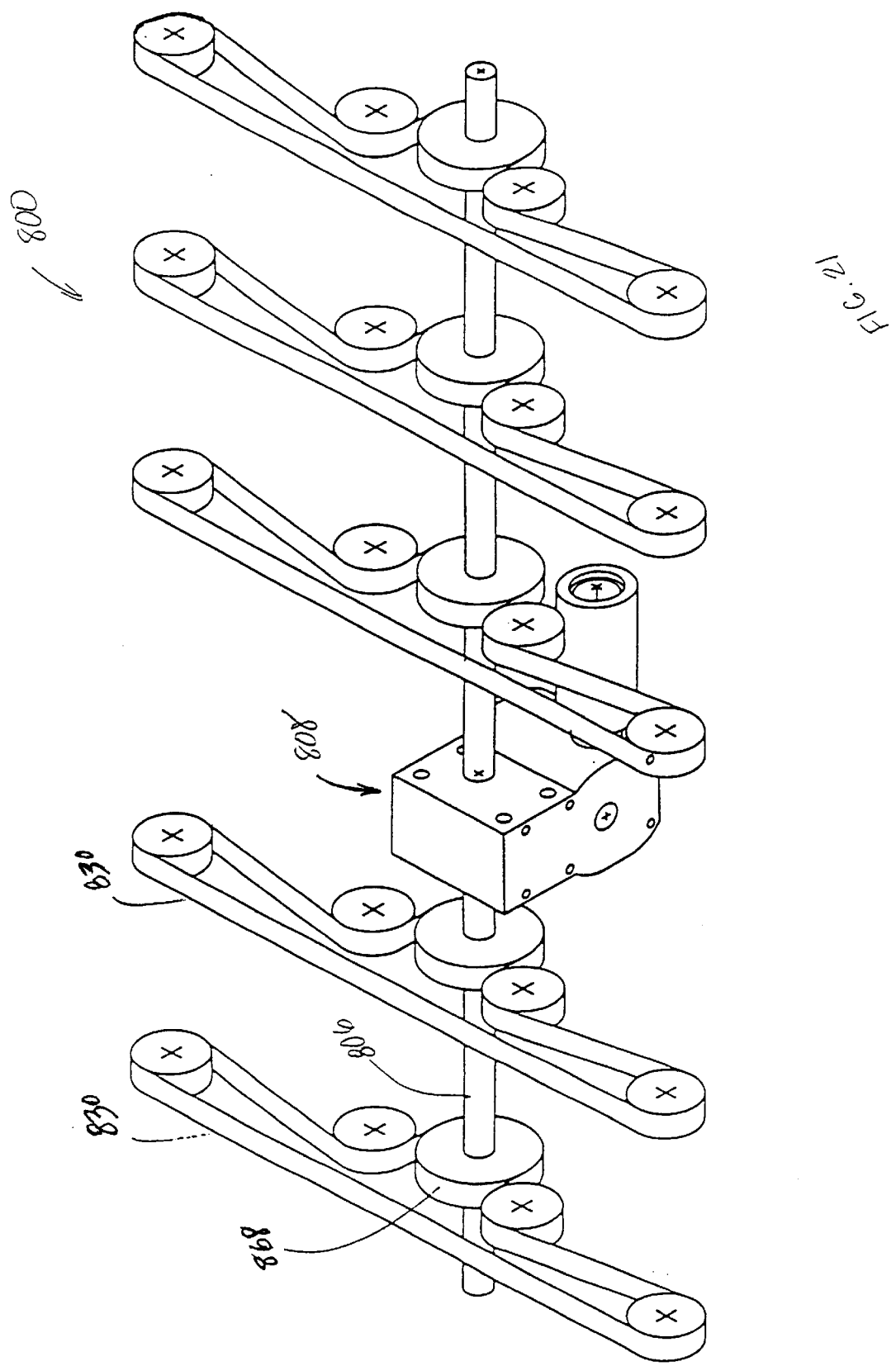
FIG. 21 is a schematic perspective view of yet another embodiment of a drive assembly of the present invention.

Referring to FIG. 21, the numeral 800 generally designates another embodiment of the drive system of the present invention. Drive system 800 includes a driven belt shaft 806 which is driven by an actuator 808. Similar to the previous embodiments, driven belt shaft 806 supports a plurality of driven sheaves 868, which is similar to the driven sheaves 68 in the first embodiment, for driving transfer belts 830. For further details of the sheave assembly, reference is made to the first embodiment.

Figure 22:
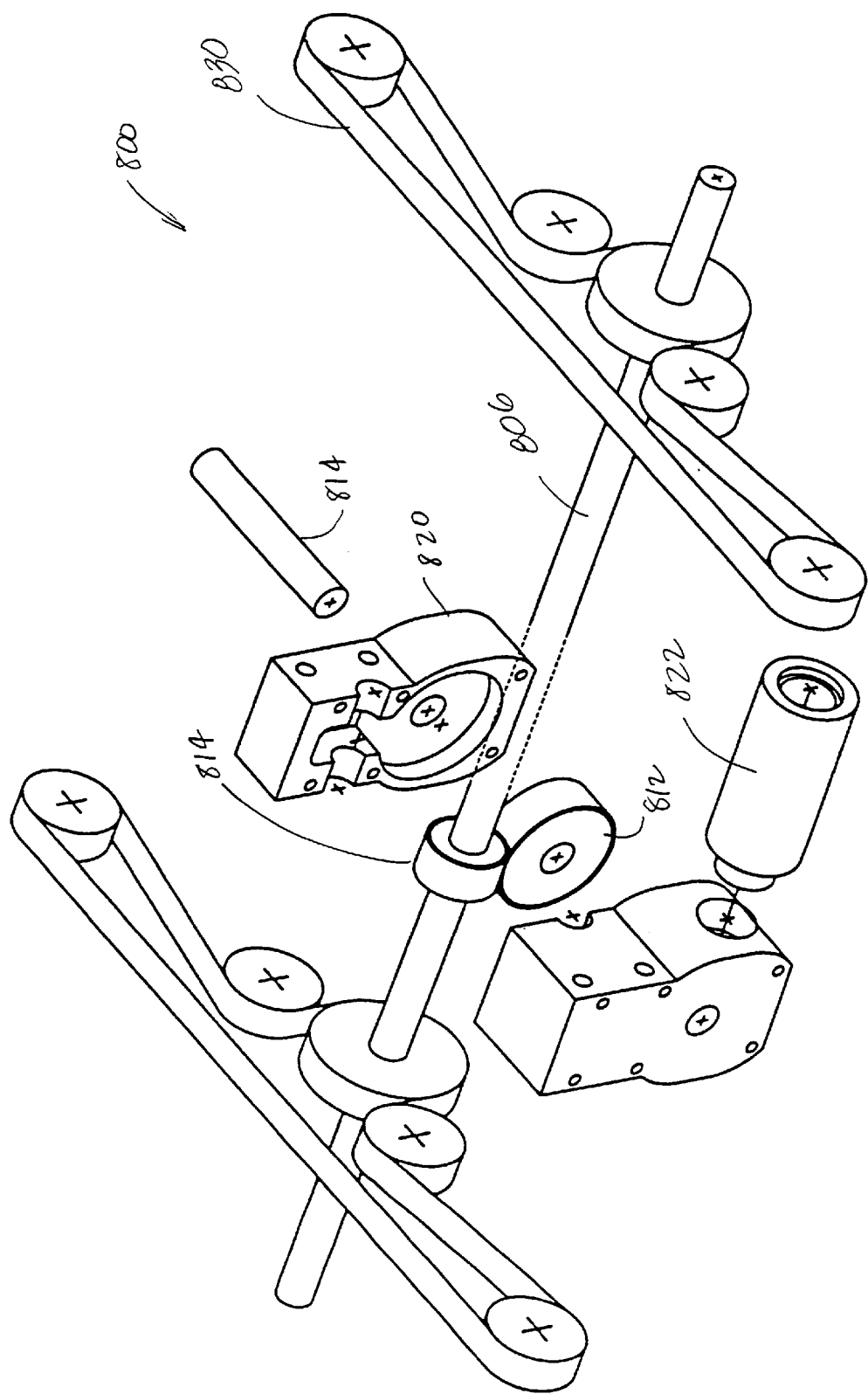
FIG. 22 is a schematic perspective view of yet another embodiment of a drive assembly of the present invention.

Referring to FIG. 22, actuator 808 includes a drive gear 812 which engages a corresponding gear, such as a crossed helical gear 814, mounted to shaft 806. Drive gear 812 is mounted on a shaft 814 in a housing 820 and is driven by a driver, such as an air cylinder or an electric motor 822, including, for example, a servo motor, a linear motor, or the like. In this manner, driven belt shaft 806 can be driven independently of the main line shaft of the adjacent conveyor sections and thereby provides a simplified drive system.

Referring to FIG. 23, pulley 44b of each transfer assembly 40 may be driven by a flexible shaft 1068. Flexible shaft 1068 includes a drive beveled gear 1070 that engages a beveled gear 1072 provided on pulley 44b. Flexible shaft 1068 also includes a driven beveled gear 1074 that drivingly engages a beveled gear 1076 mounted and keyed to shaft 100. In this manner, when shaft 100 is driven, flexible shaft 1068 will transfer torque from gear 1076 to gear 1072 on pulley 44b to thereby drive pulley 44b and in turn transfer belt 30. In the illustrated embodiment, shaft 100 includes a corresponding member of beveled drive gears 1076 for each flexible shaft 1068. Therefore, each transfer assembly is individually driven. By incorporating flexible shafts, the overall length of the transfer belt 30 remains unchanged when transfer assembly 40 is moved between its retracted and extended positions. As previously described, transfer sheaves or pulleys 44a and 44b are commonly supported by support 42 which is lifted by lift assembly 72. Optionally, a clutch may be incorporated between the respective bevel gears (1072) and the pulleys (44b) or between shaft 100 and gear 1076, which is selectively actuated to selectively drive pulley 44b so that the transfer belt (30) is not continuously running.

Referring to FIG. 25, alternately, drive shaft 100 may include a beveled gear 1076' that drives more than one flexible shaft 1068 so that the transfer belts are driven by a common gear mounted to shaft 100.

While several forms of the invention have been shown and described, other forms will now be apparent to those skilled in the art. For example, as noted, the drive assembly may comprise a continuous drive design in which the drive belts directly couple to the drive shaft, thus eliminating the clutch assembly or assemblies. In this manner, the transfer belts move when the conveyor shaft is driven. Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

The embodiments of the invention in which I claim an exclusive property right or privilege are defined as follows:

1. A transfer assembly for positioning between conveyor sections defining a conveying surface, the conveying surface defining a conveying direction, said transfer assembly for transferring at least one article laterally with respect to the conveying surface in a direction angled to the conveying direction, said transfer assembly comprising:

at least two conveying devices defining a conveying surface for at least generally aligning with the conveying surface of the convey or sections;

a sheave assembly, said sheave assembly comprising:
a support member;
a reinforced transfer belt having a belt length and defining a transfer surface; and
at least two transfer sheaves mounted to said support member, said transfer sheaves supporting said transfer belt, and said support member being adapted to move said transfer belt between a non-transferring position wherein said transfer surface is below said conveying surface of said conveying devices and a transferring position wherein said transfer surface is raised above said conveying surface of said conveying devices, said transfer assembly being adapted to move said transfer belt wherein said belt length of said transfer belt changes less than one-quarter of an inch when moved between its non-transferring position and its transferring position.

2. The transfer assembly according to claim 1, wherein said transfer belt comprises a Kevlar® reinforced transfer belt.

3. The transfer assembly according to claim 1, wherein said transfer belt comprises a fiberglass reinforced transfer belt.

4. The transfer assembly according to claim 1, wherein said transfer belt comprises a polyester reinforced transfer belt.

5. The transfer assembly according to claim 1, wherein said transfer belt is reinforced by a steel core.

6. The transfer assembly according to claim 1, wherein said transfer belt includes a generally rectangular cross-section.

7. The transfer assembly according to claim 6, wherein said transfer belt includes a plurality of projecting teeth.

8. The transfer assembly according to claim 7, wherein said teeth project from said transfer surface.

9. The transfer assembly according to claim 7, wherein said transfer belt includes a driven surface, at least a group of said teeth projecting from said driven surface.

10. The transfer assembly according to claim 9, wherein another group of said teeth project from said transfer surface.

11. The transfer assembly according to claim 1, wherein said transfer belt includes a projecting rib.

12. The transfer assembly according to claim 11, wherein said projecting rib projects from said transfer surface.

13. The transfer assembly according to claim 12, wherein said transfer belt includes a driven surface, said driven surface including a plurality of projecting teeth.

14. The transfer assembly according to claim 1, wherein said transfer belt includes belt width and belt height, said belt width being greater than said belt height.

15. The transfer assembly according to claim 1, wherein said sheave assembly further comprises a track, at least a portion of said transfer belt being guided through said track, said track providing retention of said transfer belt on said sheave assembly.

16. The transfer assembly according to claim 1, further comprising a lift assembly, said lift assembly moving said sheave assembly between said transferring position and said non-transferring position.

17. The transfer assembly according to claim 16, wherein said lift assembly includes a cylinder, said cylinder lifting and lowering said sheave assembly to move said sheave assembly between its transferring position and its non-transferring position.

18. The transfer assembly according to claim 17, wherein said transfer assembly includes a frame, said cylinder being pivotally mounted at one end to said frame of transfer assembly.

19. The transfer assembly according to claim 18, wherein said one end is pivotally mounted to said frame of said transfer assembly by a crank arm, said crank arm including a lifter pin far selectively lifting said sheave assembly when said cylinder is actuated.

20. The transfer assembly according to claim 19, wherein said crank arm comprises a first crank arm, said transfer assembly including a second crank arm having a second lifter pin, said first crank arm and said second crank arm being coupled whereby movement of one of said crank arms induces movement in the other crank arm, and said first and second lifter pins selectively lifting said sheave assembly when said cylinder is actuated.

21. The transfer assembly according to claim 1, wherein said transfer belt includes a generally horizontal upper bolt section defining said transfer surface and a lower belt section, at least a portion of said lower belt section being substantially parallel to said upper belt section when said transfer belt is in its transferring position and its non-transferring position.

22. The transfer assembly according to claim 21, further comprising a driven shaft and a drive shaft, said drive shaft selectively driving said driven shaft, and said driven shaft driving said transfer sheaves to thereby drive said transfer belt.

23. The transfer assembly according to claim 22, wherein said transfer belt forming a closed loop around said transfer sheaves and said driven shaft, and said driven shaft remaining stationary when said sheave assembly is moved to said transferring position.

24. A sheave assembly of a transfer assembly, said transfer assembly for transferring one or more articles laterally with respect to a conveying surface, said sheave assembly comprising:

a lift assembly;
a fixed support member;
a moveable support member, said lift assembly moving said moveable support member between a non-transfer position and a transfer position;
a transfer belt having a closed loop, and comprising a reinforced belt;
a driven pulley supported by said fixed support; and
at least two transfer sheaves mounted to said moveable support member, said transfer sheaves supporting said transfer belt, said transfer belt extending around said driven pulley and being driven around said closed loop by said driven pulley and said moveable support member including a rail extending across at least a portion of said moveable support member, said transfer belt extending trough said rail, and said rail at least laterally retaining said transfer belt on said sheave assembly when said lift assembly moves said moveable support member to said transfer position and said transfer belt is subject to a lateral force from an article being transferred by said transfer belt.

25. The transfer belt according to claim 24, wherein said transfer belt includes at least one of a plurality of projecting teeth and a projecting rib.

26. The sheave assembly according to claim 24, wherein said transfer belt comprises a reinforced transfer belt from a group including a Kevlar® reinforced transfer belt, a fiberglass reinforced transfer belt, a polyester reinforced transfer belt, and a steel core reinforced transfer belt.

27. The sheave assembly according to claim 24, wherein said transfer belt includes a generally rectangular cross-section.

28. A transfer assembly for a conveyor system, said transfer assembly comprising:
    at least two conveying surfaces defining a conveying direction;
    at least two driven transfer sheaves positioned between said conveying surfaces;
    a transfer bait extending over said transfer sheaves, said transfer belt defining a transfer surface and having a length, a width, and a height, said width being greater than said height;
    a driven belt shaft, said driven belt shaft having a driven sheave, said transfer belt forming a closed loop around said transfer sheaves and said driven sheave;
    said transfer belt being driven by said driven sheave to move in a transfer direction non-parallel to said conveying direction;
    an actuator moving said transfer sheaves between a first position wherein said transfer surface of said transfer belt is below said conveying surface and a second position wherein said transfer surface is above said conveying surface for lifting an article being conveyed on said conveying surface and transferring the article in said transfer direction; and
    said transfer belt having a generally horizontal belt portion defining said transfer surface and generally horizontal lower belt portions between said transfer sheaves and said driven sheave, said generally horizontal lower portions moving from a lower position below a horizontal reference plane to a higher position above said horizontal reference plane when said actuator moves said transfer sheaves wherein the change in length of said transfer belt is minimized when said actuator moves said transfer sheaves between said first and second positions.

29. The transfer assembly according to claim 28, wherein said transfer belt comprises a reinforced transfer belt.

30. The transfer assembly according to claim 29, wherein said reinforced transfer belt includes one of a plurality of projecting teeth and a projecting rib.

31. The transfer assembly according to claim 28, wherein said at least two conveying surfaces comprise a plurality of conveying surfaces, said at least two driven transfer sheaves comprising a pair of driven transfer sheaves, and said transfer assembly further comprising a plurality of said pair of transfer sheaves and a corresponding plurality of said transfer belts.

32. The transfer assembly according to claim 31, wherein said plurality of said pairs of said transfer sheaves are supported by a support.

33. The transfer assembly according to claim 32 further comprising an actuator moving said support whereby said transfer sheaves are moved between a first position wherein said transfer surfaces of said transfer belts are below said conveying surface and a second position wherein said transfer surfaces of said transfer belts are above said conveying surface for lifting an article being conveyed on said conveying surface and transferring the article in said transfer direction.

34. The transfer assembly according to claim 30, wherein said actuator contacts said support at at least two points to maintain said transfer sheaves and said transfer belts generally level.

35. The transfer assembly according to laim 28, further comprising a main line drive shaft, said main line drive shaft selectively driving said driven belt shaft.

36. The transfer assembly according to claim 35, wherein said main line shaft includes a clutch assembly for selectively driving said driven belt shaft.

37. The transfer assembly according to claim 35, wherein said main line drive shaft is adapted to selectively drive said driven belt shaft in a clockwise direction and a counter-clockwise direction wherein said transfer belt moves in a first transferring direction when said driven belt shaft is moved in a clockwise direction and moves in an opposite second transfer direction when said driven belt shaft is moved in a counter-clockwise direction.

38. The transfer assembly according to claim 35, wherein said at least two conveying surfaces are defined by at least two rollers.

39. The transfer assembly according to claim 37, wherein said main line drive shaft drives said rollers.

40. A transfer assembly for a conveyor system, said transfer assembly comprising:
    at least two conveying surfaces defining a conveying direction:
    at least two driven transfer sheaves positioned between said conveying surface;
    a transfer belt extending over said transfer sheaves, said transfer belt defining a transfer surface and having a length;
    a driven belt shaft, said driven belt shaft having a driven sheave, said transfer belt forming a closed loop around said transfer sheaves and said driven sheave said transfer belt being driven by said driven sheave to move in a transfer direction non-parallel to said conveying direction; and
    an actuator moving said transfer sheaves between a first position wherein said transfer surface of said transfer belt is below said conveying surface and a second position wherein said transfer surface is above said conveying surface for lifting an article being conveyed on said conveying surface and transferring the article in said transfer direction, and said transfer belt having a generally horizontal belt portion defining said transfer surface and generally horizontal lower belt portions between said transfer sheaves and said driven sheave wherein said length of said transfer belt changes less than an inch when moved between its non-transferring position and its transferring position.

41. The transfer assembly according to 40, wherein said transfer belt changes less than one-half an inch when moved between its non-transferring position and its transferring position.

42. The transfer assembly according to claim 41, wherein said transfer belt changes about a thirty-second of an inch when moved between its non-transferring position and its transferring position.

43. A transfer assembly for a conveyor system, said transfer assembly comprising:

at least two conveying surfaces defining a conveying direction;

at least two driven transfer sheaves positioned between said conveying a transfer belt extending aver said transfer sheaves, said transfer belt defining a transfer surface and having a length;

a driven belt shaft, said driven belt shaft having a driven sheave, said transfer belt fanning a closed loop around said transfer sheaves and said driven sheave;

a main drive line shaft, said main line drive shaft selectively driving said driven belt shaft;

said transfer belt being driven by said driven sheave to move in a transfer direction non-parallel to said conveying direction;

a main line drive shaft, said main line drive shaft selectively driving said driven belt shaft, and said main line drive shaft being adapted to selectively drive said driven belt shaft in a clockwise direction and a counter-clockwise direction wherein said transfer belt moves in a first transferring direction when said driven belt shaft is moved in a clockwise direction and moves in an opposite second transfer direction when said driven belt shaft is moved in a counter-clockwise direction, said main line shaft including first and second clutch assemblies, said first clutch assembly selectively driving said driven belt shaft in a clockwise direction, and said second clutch assembly selectively driving said driven belt shaft in a counter-clockwise direction wherein said transfer belt moves in a said first transferring direction when said driven belt shaft is moved in a clockwise direction and moves in said opposite second transfer direction when said driven belt shaft is moved in a counter-clockwise direction; and an actuator moving said transfer sheaves between a first position wherein said transfer surface of said transfer belt is below said conveying surface and a second position wherein said transfer surface is above said conveying surface for lifting an article being conveyed on said conveying surface and transferring the article in a respective transfer direction, and said transfer heft having a generally horizontal belt portion defining said transfer surface and generally horizontal lower belt portions between said transfer sheaves and said driven sheave wherein the chance in length of said transfer belt is minimized when said actuator moves said transfer sheaves between said first and second positions.

* * * * *

UNITED STATES PATENT AND TRADEMARK OFFICE
CERTIFICATE OF CORRECTION

| | |
|---|---|
| PATENT NO. | : 6,644,459 B2 |
| APPLICATION NO. | : 10/025639 |
| DATED | : November 11, 2003 |
| INVENTOR(S) | : Thomas A. van Leeuwen and Mohammad Ghaeli |

It is certified that error appears in the above-identified patent and that said Letters Patent is hereby corrected as shown below:

Column 9:
Line 51, "fill" should be --full--.

Column 10:
Line 38, "fill" should be --full--.

Column 13:
Line 16, Claim 1, "convey or" should be --conveyor--.

Column 14:
Line 22, Claim 19, "far" should be --for--.
Line 33, Claim 21, "bolt" should be --belt--.
Line 58, Claim 24, Delete --,-- after "loop".
Line 65, Claim 24, Insert --,-- after "pulley".

Column 15:
Line 2, Claim 24, "trough" should be --through--.
Line 24, Claim 28, "balt" should be --belt--.

Column 16:
Line 1, Claim 33, Insert --,-- after "claim 32".
Line 10, Claim 34, "claim 30" should be --claim 33--.
Line 14, Claim 35, "laim" should be --claim--.
Line 31, Claim 39, "claim 37" should be --claim 38--.
Line 36, Claim ":" should be --;-- after "direction".
Line 38, Claim 40, "surface" should be --surfaces--.
Line 44, Claim 40, Insert --;-- after "sheave" in the second occurrence.
Lines 44-47, Claim 40, Begin new paragraph with --said transfer belt being driven by said driven sheave to move in a transfer direction non-parallel to said conveying direction; and--.
Line 61, Claim 41, Insert --claim-- before "40".

UNITED STATES PATENT AND TRADEMARK OFFICE
CERTIFICATE OF CORRECTION

PATENT NO. : 6,644,459 B2
APPLICATION NO. : 10/025639
DATED : November 11, 2003
INVENTOR(S) : Thomas A. van Leeuwen and Mohammad Ghaeli It is certified that error appears in the above-identified patent and that said Letters Patent is hereby corrected as shown below:

Column 17:
Line 8, Claim 43, Insert --surfaces;-- after "conveying".
Line 8, Claim 43, "aver" should be --over--.
Lines 8-10, Claim 43, Begin new paragraph with --a transfer belt extending over said transfer sheaves, said transfer belt defining a transfer surface and having a length;--.
Line 12, Claim 43, "fanning" should be --forming--.

Column 18:
Line 7, Claim 43, Delete --a-- before "said" in the second occurrence.
Line 18, Claim 43, "heft" should be --belt--.
Line 22, Claim 43, "chance" should be --change--.

Signed and Sealed this

Twenty-seventh Day of May, 2008

JON W. DUDAS
*Director of the United States Patent and Trademark Office*